(12) United States Patent
Lei et al.

(10) Patent No.: US 12,379,477 B2
(45) Date of Patent: *Aug. 5, 2025

(54) ULTRASONIC DIRECT ECHO PATH REDUCTION

(71) Applicant: InvenSense, Inc., San Jose, CA (US)

(72) Inventors: Tony Lei, San Francisco, CA (US); Joe Youssef, Noyarey (FR); Daniela Hall, Eybens (FR); Ben Eovino, Berkeley, CA (US); Stefon Shelton, Oakland, CA (US)

(73) Assignee: InvenSense, Inc., San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/987,151

(22) Filed: Nov. 15, 2022

(65) Prior Publication Data

US 2023/0152433 A1     May 18, 2023

Related U.S. Application Data

(60) Provisional application No. 63/279,996, filed on Nov. 16, 2021, provisional application No. 63/279,940, filed on Nov. 16, 2021.

(51) Int. Cl.
| | |
|---|---|
| *G01S 7/521* | (2006.01) |
| *B06B 1/02* | (2006.01) |
| *G01S 15/08* | (2006.01) |
| *G01S 15/931* | (2020.01) |

(Continued)

(52) U.S. Cl.
CPC ............ *G01S 7/521* (2013.01); *B06B 1/0261* (2013.01); *G01S 15/08* (2013.01); *G01S 15/931* (2013.01); *G05D 1/0255* (2013.01); *G01S 2015/937* (2013.01)

(58) Field of Classification Search
CPC ........ G10K 9/122; G10K 9/18; G10K 11/025; B06B 1/0261; G01S 7/521; G01S 15/931
See application file for complete search history.

(56) References Cited

U.S. PATENT DOCUMENTS

| | | | |
|---|---|---|---|
| 8,035,082 B2 * | 10/2011 | Yamazaki | G01N 23/2251 250/396 ML |
| 2009/0212213 A1 * | 8/2009 | Nakasuji | H01J 37/28 250/442.11 |

(Continued)

*Primary Examiner* — Daniel L Murphy
*Assistant Examiner* — Amie M Ndure

(57) ABSTRACT

A robotic cleaning appliance includes a housing to which is coupled a surface treatment item and a sensor assembly with first and second transducers and an acoustic interface. The first sonic transducer transmits sonic signals through an acoustic interface and out of a first acoustic opening toward a surface beneath the robotic cleaning appliance. The sonic signals reflect from the surface as corresponding returned signals received by the second sonic transducer via a second acoustic opening port of the acoustic interface. A first plurality of annular rings is defined in the external surface around the first acoustic opening port and a second plurality of annular rings is defined in the external surface around the second acoustic opening port. The pluralities of annular rings attenuate direct path echoes from a subset of the transmitted sonic signals which attempt to travel across the external surface to the second acoustic opening port.

20 Claims, 21 Drawing Sheets

(51) Int. Cl.
*G05D 1/00* (2006.01)
*G05D 1/02* (2020.01)

(56) References Cited

U.S. PATENT DOCUMENTS

| | | | |
|---|---|---|---|
| 2010/0096550 A1* | 4/2010 | Yamazaki | H01J 37/05 |
| | | | 250/310 |
| 2021/0265862 A1* | 8/2021 | Yeo | H02J 50/005 |
| 2022/0285180 A1* | 9/2022 | Menk | H01L 21/67196 |

* cited by examiner

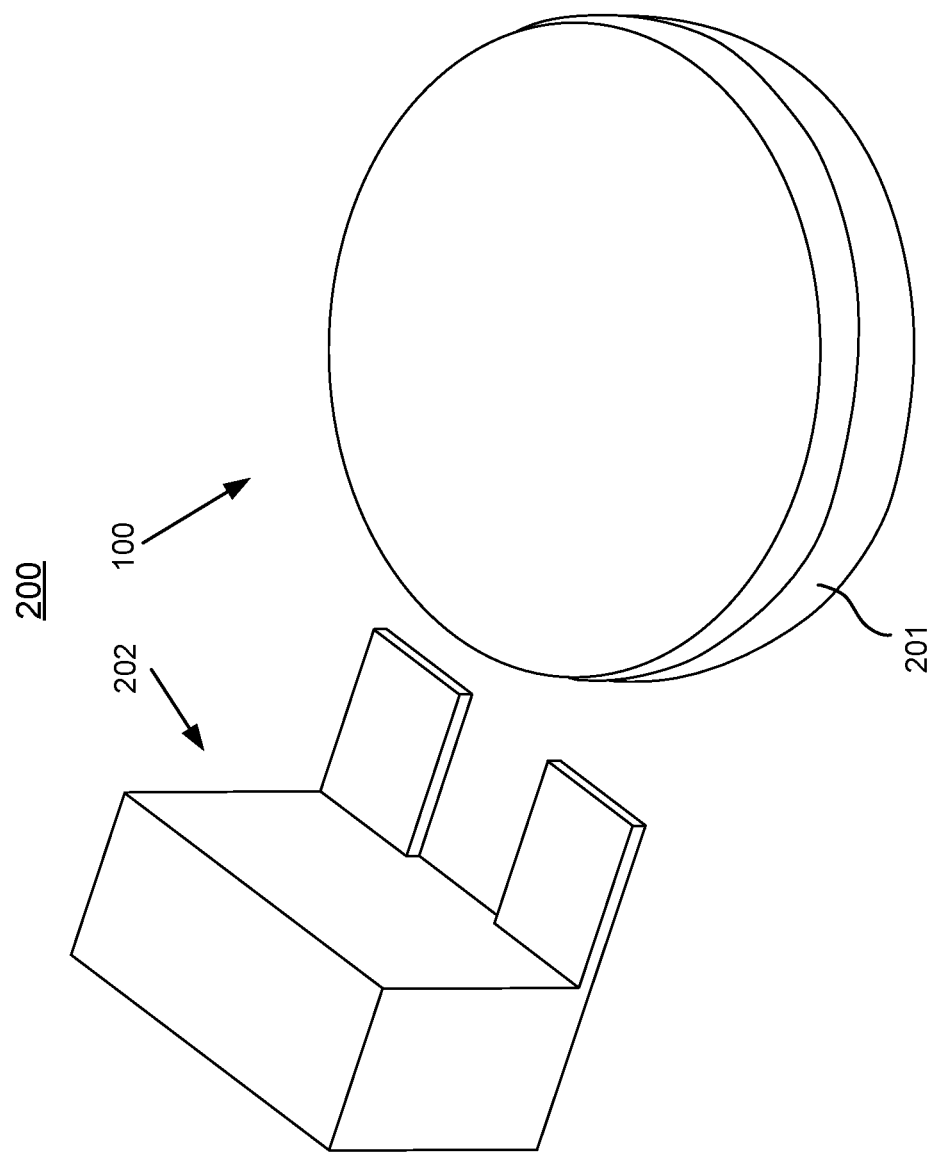

1000A

1000B

ULTRASONIC DIRECT ECHO PATH REDUCTION

CROSS-REFERENCE TO RELATED APPLICATIONS

This application claims priority to and benefit of co-pending U.S. Provisional Patent Application No. 63/279,996 filed on Nov. 16, 2021 entitled "ENGRAVED RING FOR ULTRASONIC DIRECT ECHO PATH REDUCTION" by Tony Lei et al., and assigned to the assignee of the present application, the disclosure of which is hereby incorporated herein by reference in its entirety.

This application claims priority to and benefit of co-pending U.S. Provisional Patent Application No. 63/279,940 filed on Nov. 16, 2021 entitled "ULTRASONIC CLIFF DETECTION AND DEPTH ESTIMATION USING TILT ANGLE," by Daniela Hall et al., and assigned to the assignee of the present application, the disclosure of which is hereby incorporated herein by reference in its entirety.

BACKGROUND

A variety of devices exist which move about on or operate on floors or other surfaces such as walls, windows, roofs, tables, countertops, sidewalks, roads, and the like. The surfaces may be indoor surfaces, outdoor surfaces, or some combination. One or more examples of such a device may be semi-autonomous, by which is meant that while operating on one or more surfaces some functions of the device are controlled by a human and some are automated. One or more examples of such a device may be robotic, by which is meant that while operating on one or more surfaces some or all functions of the device may operate autonomously under the control of one or more processors. Some examples of these devices may include, but are not limited to: remote control vehicles, telepresence robots, electric scooters, electric wheelchairs, wheeled delivery robots, flying drones operating near a surface or about to land on or take off from a surface, wheeled delivery vehicles, floor vacuums, and robotic cleaning appliances (which include robotic floor cleaners and/or robotic floor vacuums).

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 2 shows an upper front perspective view of one example of a system which includes a device which moves about or operates on a surface and a base station for the device, in accordance with various embodiments.

DESCRIPTION OF EMBODIMENTS

Figure 1A:
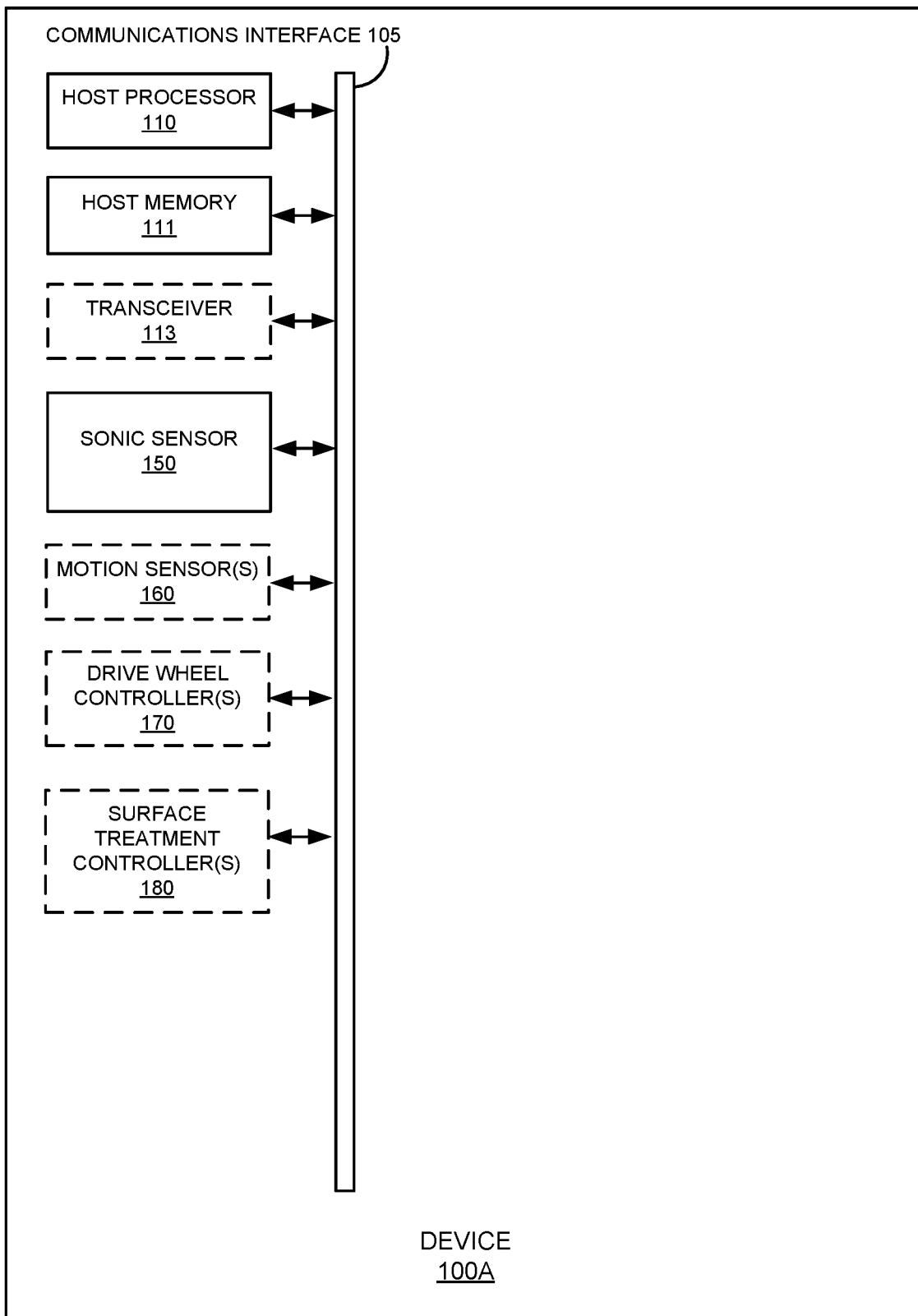
FIGS. 1A and 1B show example block diagrams of some aspects of a device which moves about or operates on a surface, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A variety of devices which move about on or operate on floors or other surfaces may benefit from being able to determine information about surface upon which they are moving or operating. Surfaces may include floors, building exteriors, windows, dirt, gravel, fabric, roofing, roads, sidewalks, trails, water (or other liquid), etc. A surface may be flat and smooth or rough and textured. In some embodiments, such as at the edge of a downward stair which meets a surface, the surface may abruptly drop off in the fashion of the edge of a cliff.

During the operation of a device on a surface or as it moves about on a surface, it may be advantageous for the device to detect information about the surface, such as whether it is wet (and in some instances how wet on a scale of wetness), dirty (and in some instances, how dirty and/or dirty with what), dry, hard (and in some instances, how hard on a scale of hardness), soft (and in some instances how soft on a scale of softness), etc. Likewise, it may be similarly advantageous during operation of a device on a surface for the device to detect cliff like drop offs and/or to estimate a depth of drop from the surface upon which the device is operating. For example, simply detecting a cliff edge may be sufficient to permit the device to change course to avoid the cliff. Estimating the depth of the cliff may permit the device to determine if the drop off is too deep for the device to navigate down or else if it is shallow enough for the device to cross the cliff edge to the surface below and continue operation. When performing such detection in very close proximity to a surface, such as a floor, there can be quite a bit of noise due to the high number of reflections. This is especially the case when sensing hard surfaces such as wood, vinyl, or tile flooring. Herein, techniques involving the defining of one or more rings around the a sensor horn's opening (referred to herein as an "acoustic opening port") are described. The defining may cause the rings to be represented as being debossed/engraved-in or embossed/raised-from the external surface. The defined rings operate to reduce direct echo path reflections (noise) and increase signal amplitude by disrupting the sound pressure in the small gap between where sonic signals are emitted and a floor surface. More particularly, the defined rings reduce direct path echoes which result from transmitted sonic signals which attempt to travel across an external surface that exists between the acoustic opening of port of a transmitting sonic sensor and the acoustic opening port of the receiving electronic sensor. In some embodiments, the configuration of the defined rings may additionally be employed to shape beam patters of one or more of transmitted sonic signals and corresponding returned signals which are reflected from a surface.

Discussion begins with a description of notation and nomenclature. Discussion then shifts to description of some block diagrams of example components of some example devices which moves about or operate on a surface. Some example depictions of a device, in the form of robotic cleaning appliance, are discussed. Some examples depictions of sensor assembly are described. A signal path of a sonic transducer is through a sensor assembly is described. The utility of adding one or more defined rings in an annular fashion around the opening to a sensor horn is described and depicted in conjunction with several example embodiments.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "transmitting," "receiving," "detecting," "estimating," "processing," "determining," or the like, refer to the actions and processes of an electronic device or component such as: a host processor, a sensor processing unit, a sensor processor, a digital signal processor or other processor, a memory, a sonic sensor (e.g., a sonic transducer), a robotic cleaning appliance, a device configured to operate on or move about a surface, some combination thereof, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), flash memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may, for example, be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise one or more sonic sensors. This sensor may be any suitable sonic sensor operating in any suitable sonic range. For example, in some embodiments, the sonic sensor may be an ultrasonic sensor which utilizes a MEMS ultrasonic transducer. In some embodiments, the sonic sensor may include digital signal processor (DSP) which may be disposed as a part of an ASIC which may be integrated into the same package as a transducer. One example of such an ultrasonic sensor which may be utilized with various embodiments, without limitation thereto, is the CH101 ultrasonic range sensor from Chirp Microsystems, a TDK Group Company, of Berkley, California. The CH101 is only one example of an ultrasonic sensor, other types and/or brands of ultrasonic sensors may be similarly utilized.

Some embodiments may, for example, comprise one or more motion sensors. For example, an embodiment with an accelerometer, a gyroscope, and a magnetometer or other compass technology, which each provide a measurement along three axes that are orthogonal relative to each other, may be referred to as a 9-axis device. In another embodiment, a three-axis accelerometer and a three-axis gyroscope may be used to form a 6-axis device. Other embodiments may, for example, comprise an accelerometer, gyroscope, compass, and pressure sensor, and may be referred to as a 10-axis device. Other embodiments may not include all the sensors or may provide measurements along one or more axes. Some or all of the sensors may be MEMS sensors. Some or all of the sensors may be incorporated in a sensor processing unit along with a sensor processor and disposed in a single semiconductor package.

In some embodiments, for example, one or more sensors may, be formed on a first substrate. Various embodiments may, for example, include solid-state sensors and/or any other type of sensors. The electronic circuits in a sensor processing unit may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

Example Device which Moves About or Operates on a Surface

Figure 1B:
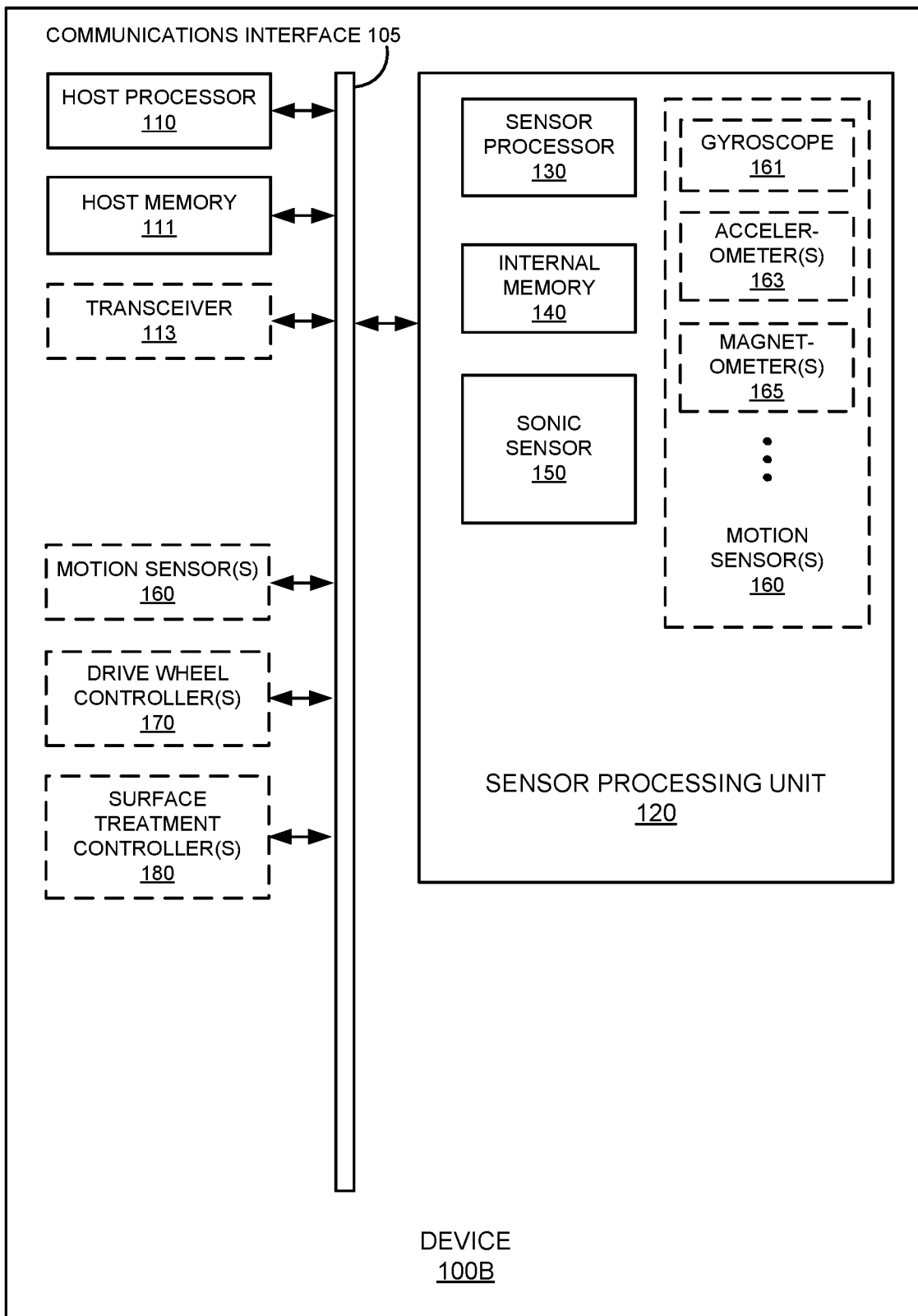

FIGS. 1A and 1B show some example components of a device 100 (e.g., device 100A or 100B) which moves about or operates on a surface. Some examples of a device 100 may include, but are not limited to: a remote control vehicles, a telepresence robot, an electric scooter, an electric wheelchair, a wheeled delivery robot, a flying drone operating near a surface or about to land on or take off from a surface, a wheeled delivery vehicle, a floor vacuum, and a robotic cleaning appliance (which includes: a robotic floor cleaner, a robotic floor vacuum, or combinations thereof).

FIG. 1A shows a block diagram of components of an example device 100A which moves about or operates on a surface, in accordance with various aspects of the present disclosure. As shown, example device 100A comprises a communications interface 105, a host processor 110A, host memory 111, and at least one sonic sensor 150. In some embodiments, device 100A may additionally include one or more of a transceiver 113, one or more motion sensors 160, one or more drive wheel controllers 170, and one or more surface treatment controllers 180 (which may control a cleaning tool and/or any surface treatment item that may take an action based upon a surface type determination). Some embodiments may include sensors used to detect motion, position, surface type, or environmental context (e.g., nearby objects and/or obstacles, whether a surface is hard or soft, whether a surface is carpeted or not carpeted, whether a surface is clean or dirty, whether a surface is wet or dry, etc.); some examples of these sensors may include, but are not limited to, infrared sensors, cameras, microphones, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of device 100A (e.g., sending commands to move, steer, avoid obstacles, and operate/control the operation of tools). Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100A.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between SPU 120 and one or more of host processor 110, host memory 111, transceiver 113, sonic sensor 150, motion sensor(s) 160, drive wheel controller(s) 170, and/or surface treatment controller(s) 180.

Host memory 111 may comprise programs, modules, applications, or other data for use by host processor 110. In some embodiments, host memory 111 may also hold information that that is received from or provided to sensor processing unit 120 (see e.g., FIG. 1B). Host memory 111 can be any suitable type of memory, including but not limited to electronic memory (e.g., read only memory (ROM), random access memory (RAM), or other electronic memory).

Transceiver 113, when included, may be one or more of a wired or wireless transceiver which facilitates receipt of data at device 100A from an external transmission source and transmission of data from device 100A to an external recipient. One example of an external transmission source/external recipient may be a base station to which device 100A returns for charging, maintenance, docking, etc. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired serial transceiver (e.g., a universal serial bus for wired communication).

Sonic sensor 150 may be a sonic transducer. In some embodiments, sonic sensor 150 is an ultrasonic transducer (i.e., a sonic transducer which operates in the ultrasonic frequency range). In some embodiments, where sonic sensor 150 operates in an ultrasonic range, it may operate in a range between 50 kHz and 500 kHz or in a range between 150 kHz and 200 kHz. Of course, other ultrasonic ranges are anticipated and usable. Sonic sensor 150 is configured to transmit sonic signals toward a surface and receive sonic returned signals. The sonic signals transmitted may include signals in one or more of the infrasound range, the acoustic range, and ultrasonic range. Returned signals include primary returned signals (which are transmitted, encounter a surface, and reflect from the surface directly to a receiver), secondary returned signals (which are multi-path reflected prior to arriving at a receiver), and direct path returned signals which do not reflect from a surface. In some embodiments, sonic sensor 150 may be part of a sensor assembly 350 (see e.g., FIGS. 4A-4E), which may include an acoustic interface housing (see e.g., FIGS. 4A-6D), where an acoustic interface tube, cavity, horn, some combination thereof, or the like used to direct transmitted sonic signals toward a surface and to direct sonic returned signals back to sonic sensor 150. In some embodiments, a pair (or more) of sensors 150 may be used, for example, with one transmitting signals which are received by the other(s).

Motion sensor(s) 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure.

Drive wheel controller(s) 170 or other mechanism(s) to govern movement, when included, may include motor controllers, switches, and/or logic which operate under instruction to: drive one or more wheels or other mechanisms of movement (e.g., tank treads, propellers), change speed of rotation of a drive wheel or other mechanism of movement, moderate an amount of slip or spin permitted for a drive wheel, move a drive wheel or other mechanism of movement in a desired direction, stop a drive wheel or other mechanism of movement, and/or to steer device 100A using a drive wheel (such as via differential speed or rotation) or other mechanism of movement.

Surface treatment controller(s) 180, when included, may include motor controllers, switches, and or logic to turn on, turn off, and/or adjust the operation and/or orientation of one or more surface treatment items, such as cleaning tool(s) and/or other item(s) that take action based upon a surface type determination.

FIG. 1B shows a block diagram of components of an example device 100B which moves about or operates on a surface, in accordance with various aspects of the present disclosure. Device 100B is similar to device 100A except that it includes a sensor processing unit (SPU) 120 in which sonic sensor 150 is disposed. SPU 120, when included, comprises: a sensor processor 130; an internal memory 140; and at least one sonic sensor 150. In some embodiments, SPU 120 may additionally include one or more motion sensors 160 (e.g., gyroscope 161, accelerometer 163, magnetometer 165) and/or one or more other sensors such a light sensor, infrared sensor, GNSS sensor, microphone, etc. In various embodiments, SPU 120 or a portion thereof, such as sensor processor 130, is communicatively coupled with host processor 110, host memory 111, and other components of device 100B through communications interface 105 or other well-known means. SPU 120 may also comprise one or more communications interfaces (not shown) similar to communications interface 105 and used for communications among one or more components within SPU 120. SPU and/or components thereof may be communicatively coupled to other components of device 100B such as via a coupling to bus 105.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100B, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of the motion sensors 160 and/or one or more sensors 150. In some embodiments, internal memory 140 may store one or more modules which may be algorithms that execute on sensor processor 130 to perform a specific function. Some examples of modules may include, but are not limited to: statistical processing modules, motion processing modules, surface type detection modules, and/or decision-making modules.

Sonic sensor 150 may be a sonic transducer which operates in the manner and in any of the sonic ranges previously described. In some embodiments, sonic sensor 150 is an ultrasonic transducer, such as a PMUT (piezoelectric micromachined ultrasonic transducer). Sonic sensor 150 may be a MEMS device and may be very small, such as having a facing surface of less than 4 mm by 4 mm by 1.5 mm. An ultrasonic sensor may be large or small, depending on the application and the space available. In some embodiments, sonic sensor 150 may be a SOC (system on a chip) which includes a DSP. In some embodiments, the SOC packaging of sonic sensor 150 comprises sensor processing unit 120 and includes sensor processor 130 and internal memory 140. In some embodiments, sonic sensor 150 may be part of a of sensor (see e.g., FIGS. 4A-4E), which may include a tube used to direct transmitted sonic signals toward a surface and to direct sonic returned signals back to sonic sensor 150.

Motion sensors 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure. Motion sensor(s) 160 are communicatively coupled with sensor processor 130 by a communications interface, bus, or other well-known communication means.

Example System

FIG. 2 shows an upper front perspective view of one example of a system 200 which includes one embodiment of a device 100 which moves about or operates on a surface and also includes a base station 202 for the device 100, in accordance with various embodiments. Device 100 includes a housing 201 to which one or more items may be coupled. Base station 202 provides a location at which a device 100 may be positioned or parked or docked when not moving about or operating on a surface. In some embodiments, base station 202 (which may also be referred to as dock 202) may provide information/instructions to device 100 and/or receive information from device 100, such as via physical and/or wireless communication coupling to transceiver 113. In some embodiments, base station 202 may provide an electrical charger for device 100 such that, via physical or wireless (e.g., inductive) electrical coupling, base station 202 electrically charges device 100 when device 100 is coupled with or suitably oriented with base station 202.

Figure 3:
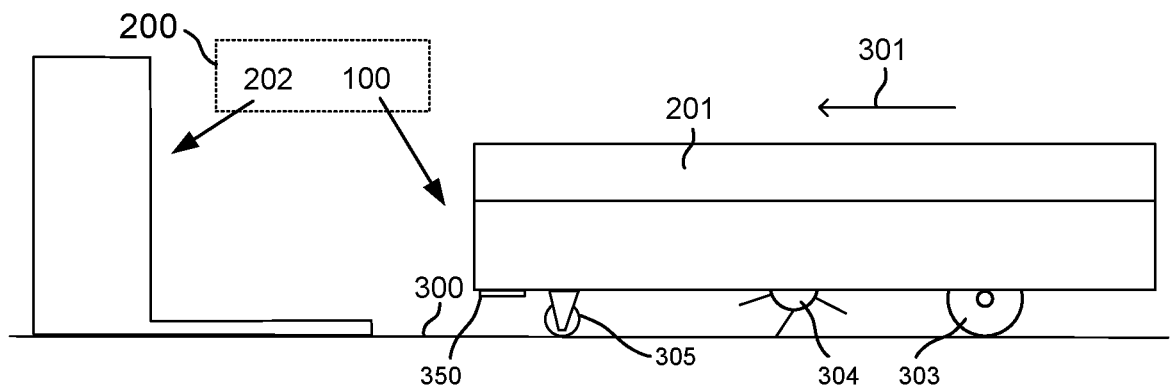
FIGS. 3 shows a side elevational view of one example of the system of FIG. 2, which includes a device which moves about or operates on a surface and a base station for the device, in accordance with various embodiments.

FIG. 3 shows a side elevational view of the example of a system 200 of FIG. 2, which includes a device 100 which moves about or operates on a surface and a base station 202 for the device 100, in accordance with various embodiments. As illustrated in FIG. 3, device 100 and base station 202 are disposed on a surface 300, upon which device 100 moves about and operates. Device 100 is depicted, by way of example and not of limitation, as a robotic cleaning appliance. Device 100 includes a sensor assembly 350 coupled with housing 201 or any suitable portion of device 100. The sensor assembly 350 includes a sonic sensor 150 (as will be described in conjunction with FIGS. 4A-6D). Although sensor assembly 350 is shown on the bottom of device 100 and directed toward surface 300 (e.g., toward the floor), in other embodiments, a sensor assembly 350 may additionally or alternatively be disposed on another portion for detecting vertical surfaces (e.g., walls) and/or overhanging surfaces. Device 100 may include one or more wheels 303 and/or 305, which may be driven and/or controlled by drive wheel controller(s) 170. As depicted, sensor assembly 350 is positioned in front of a front wheel 305 to detect surface types and cliffs (i.e., drop-offs) in a forward direction of travel 301 of device 100 prior to wheel 305 and/or surface treatment item 304 encountering the surface or drop-off. Device 100 may include one or more surface treatment items, such as surface treatment item 304, which may be driven and/or controlled by surface treatment controller(s) 180. The depiction of surface treatment item 304 is merely an example and is not meant to limit the type of surface treatment item, tool, or tools represented by the depiction. Without limitation thereto, surface treatment item 304 may comprise one or more or some combination of: a suction tool or suction opening with respect to a floor surface of floor 300 or other surface; a rotary tool (e.g., a roller brush or broom); a sweeping tool (e.g., a broom); a wiping tool (e.g., a cloth/cloth covered surface); a brushing tool (e.g., a fixed or movable brush head); a dusting tool; a mopping tool; and a spraying tool configured to spray a cleaner or other liquid.

In FIG. 3, device 100 is traveling in direction 301 on surface 300 and is preparing to dock with base station 202. The direction of travel depicted is a forward traveling direction for device 100.

With reference to FIG. 3, sonic signals transmitted by a sonic sensor 150 may be emitted from an opening in sensor assembly 350, toward surface 300, and corresponding returned signals received from the surface 300 by a sensor 150 (150, 150B) may be utilized by device 100 to detect a surface type of surface 300. In some embodiments, sonic sensing may also facilitate or assist in detecting whether a device 100 is level, unlevel, stuck, or operating without one of its wheels/surface contact points in contact with a surface and may additionally operate to detect nearby objects (to avoid); to detect information about the surface upon which device 100 operates (e.g., the type of surface (soft or hard), whether the surface is wet (and if wet, how wet) or dry, and how clean or dirty the surface is; and/or to detect information about a distance to a surface in the path of travel of device 100. Amplitudes of reflected returned signals may be used by a host processor 110 or sensor processor 130 to make such determinations about a surface type and/or distance based on amplitude of corresponding returned signals and time to receive corresponding returned signals that are reflected from a surface after being transmitted by a sonic sensor 150.

Device 100 may engage, disengage, deploy, redeploy, adjust the height, adjust the speed, or make other adjustments of a surface treatment item 304 based all or in part upon a surface type detection performed using sonic sensor(s) 150 and processing of received returned signals.

In embodiments where a sensor assembly 350 is located on another portion of device 100 (e.g., a side or top portion) the surface may be a horizontal surface such as a wall, or an overhang such as the underside of a coffee table or chair.

Processing may additionally or alternatively involve comparing amplitudes of corresponding returned signals at a particular surface distance with known amplitudes for different surface types to make a determination about a surface type. Processing may additionally or alternatively include a host processor 110 or a sensor processor 130 using amplitude and delay of corresponding returned signals to detect for drop-off/cliffs in the path of a device (i.e., the edge of a stair). For example, based on the corresponding returned signals the measured distance of a surface in the path of a device 100 may suddenly increase when a drop-off is detected and/or the amplitude of a surface at a particular distance may suddenly decrease.

Device 100 may engage, disengage, deploy, redeploy, adjust the height, adjust the speed, or make other adjustments of a surface treatment item 304 based all or in part upon a drop off/cliff detection performed using sonic sensor(s) 150 and processing of received returned signals. For example, in response to such detection of the type of floor dropping off like a cliff (e.g., on the edge of a stair), device 100 may take one or more actions to adjust an aspect of the operation of the device 100. By way of example and not of limitation, in various embodiments device 100, or a portion thereof may: adjust a speed of movement of device 100; regulate a drive motor of device 100; moderate an amount of slip or spin permitted for a drive wheel of device 100; and adjust the direction of travel of device 100.

Although FIG. 3 shows only a single sensor assembly 350, some embodiments may include a plurality of transducers, which may operate at different frequencies. The nature of a surface type may influence different frequencies in a different way, and therefore, using multiple frequencies may facilitate more accurate detection/determination of the surface type.

Example Sensor Assembly

Figure 4A:
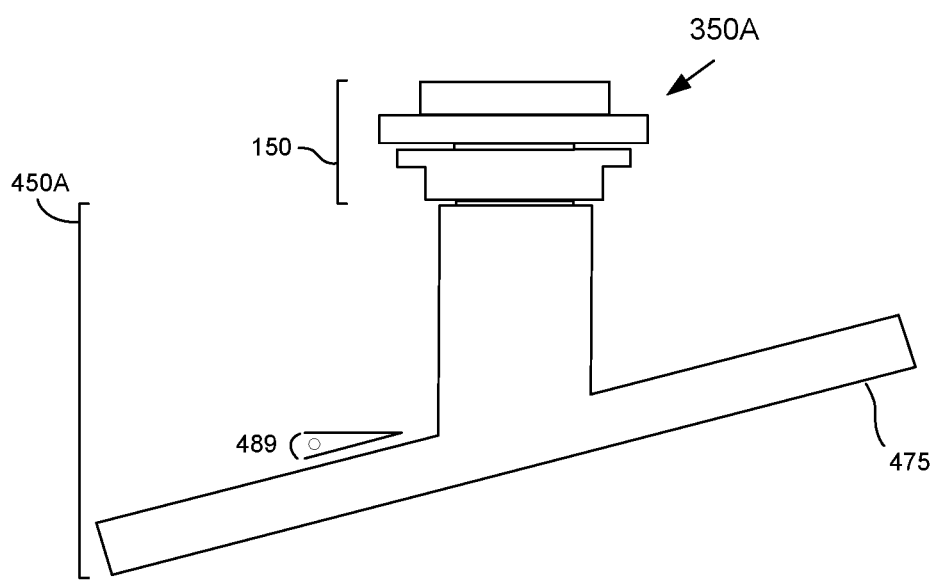
FIG. 4A illustrates a side elevational view of one example sensor assembly, with debossed rings defined in an external surface, which may be utilized on a device to transmit sonic signals and receive returned sonic signals, in accordance with various embodiments.

FIG. 4A illustrates a side elevational view of one example sensor assembly 350A which may be utilized on a device 100 to transmit sonic signals and receive returned sonic signals, in accordance with various embodiments. It should be appreciated that only a small portion sensor assembly 350A was visible protruding from the bottom of device 100. External surface 475 is designed to oriented in device 100 such that it is parallel to surface 300 upon which device 100 operates.

Sensor assembly 350A includes at least a sonic sensor 150 and typically includes two sonic transducers (150 and 150B). An acoustic interface housing 450A, which encloses and/or defines an acoustic interface tube 405, in the form of a tube, cavity, horn, or some combination thereof, is included and coupled with sonic sensor 150. In some embodiments, acoustic interface housing 450A may position sonic sensor(s) 150 at an orthogonal angle with respect to a surface it is detecting (i.e., a floor). In some embodiments, as depicted in FIGS. 4A-4F, acoustic interface housing 450A may position sonic sensor(s) 150 at a non-orthogonal tilt angle 489 with respect to a surface it is detecting (i.e., a floor). By tilting sensor(s) 150, it/they may sense farther in advance of the direction of forward travel of device 100 than if it/they were orthogonal with the expected location of the floor (i.e., pointed straight down at the floor). In some embodiments, the angle of tilt 489 from orthogonal may be in the range of greater than 0 degrees from orthogonal and up to 30 degrees from orthogonal (for example between 5 degrees and 30 degrees). In some embodiments, the angle of tilt 489 may be between about 10 from orthogonal and about 20 degrees from orthogonal. In some embodiments, the angle of tilt 489 is approximately 15 degrees from orthogonal to the floor (e.g., floor 300) or other flat surface beneath device 100. Within the range of tilt angles, a smaller angle from orthogonal increases the amplitude of returned signals (more accurate floor type determination), but also increases the latency associated with detecting the edge of a cliff in front of device 100 in the direction of travel of device 100. Within the range of tilt angles, a larger angle from orthogonal decreases the amplitude of returned signals as they tend to scatter more, but also decreases the latency associated with detecting the edge of a cliff as it provides a built-in forward look during a forward direction of travel of device 100. For example, in some embodiments where the angle of tilt is around 15 degrees, there is good balance between amplitude of returned signals from a surface below device 100 and reduced latency of cliff detection in front of device 100 in the forward direction of travel of device 100. The tilt angle 489 for an application/device may be adapted to the desired specification of the device and to the design characteristics of the complete device (e.g., size, height, distance to floor, speed of movement, cliff detection and/or depth estimation latency desired/required). In some embodiments, the title angle may be adjustable automatically depending on application or context.

In some embodiments, a plurality of sensors 150 (e.g., 150 and 150B) may be employed in an acoustic interface housing 450A (or different housings) which facilitate different tilt angles for at least two of the sensors 150. In such an embodiment, a sensor with a shallow tilt angle from vertical (i.e., orthogonal to floor 300) affords better (greater) amplitude while a sensor with a greater angle of tilt from vertical provides better (less) latency in cliff detection.

In some embodiments, the sensor assembly 350A is coupled with a device housing 201 (or other portion of device 100) such that it transmits the sonic signals in a direction toward which a surface is expected to be encountered or operated upon (e.g., downward toward a floor surface). For example, in a floor vacuum or robotic floor cleaning embodiment of device 100, a sensor assembly 350A may be disposed on or configured to sense outward from the bottom of device 100 in the manner illustrated in FIG. 3, such that transmitted sonic signals are directed toward a floor surface 300 below and in front of device 100 when device 100 is in operation. As described in FIGS. 1A and 1B a sonic sensor 150 (e.g., 150, 150B) may also be coupled with a host processor 110 or a sensor processor, in some embodiments, either or both of which operate to process and make determinations based upon received returned signals such as detecting surface types and/or detecting cliffs.

Figure 4B:
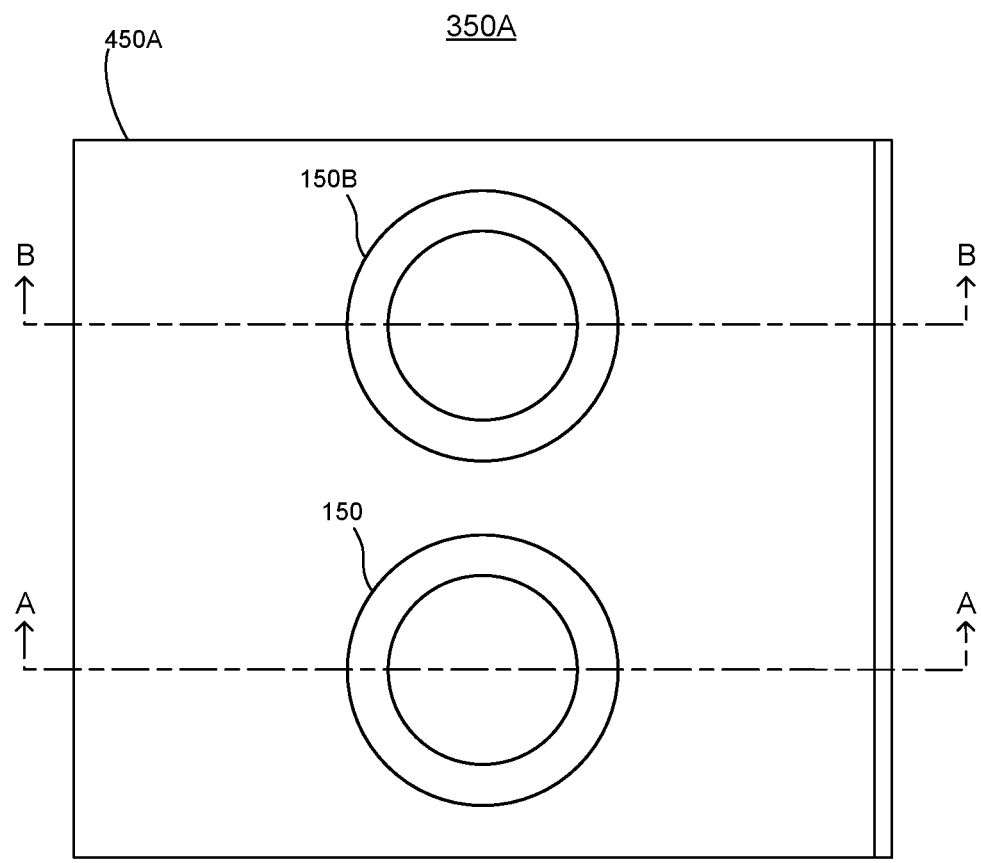
FIG. 4B illustrates a top view of the sensor assembly of FIG. 4A, in accordance with various embodiments.

FIG. 4B illustrates a top view of the sensor assembly 350A of FIG. 4A, in accordance with various embodiments. Section line A-A marks the location and orientation associated with sectional views illustrated in FIG. 4C. Section line B-B marks the location and orientation associated with sectional views illustrated in FIG. 4D. In the depicted embodiment, two sensors 150 are used, where sensor 150 may transmit while sensor 150B receives, or vice versa. In other embodiments, a single sensor 150 may be utilized to both transmit and then receive its own returned signals. Likewise, in some embodiments, sensor 150 may both emit and then receive its own returned signals, with sensor 150B both emitting and receiving its own returned signals—in such an embodiment sensor 150 and sensor 150B may sense using different frequencies.

Figure 4C:
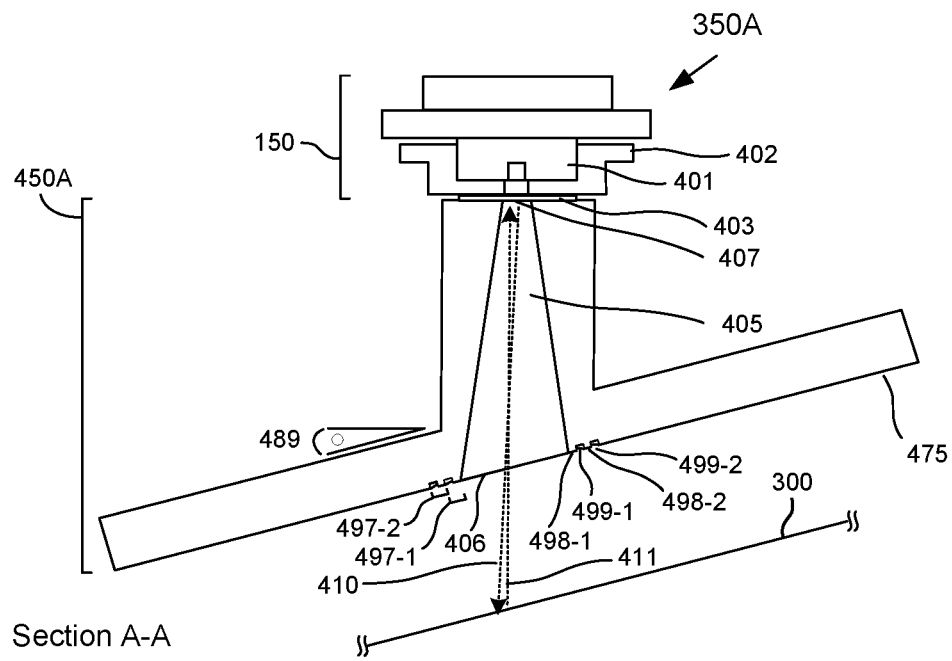
FIG. 4C illustrates a side sectional view of a configuration of the sensor assembly of FIG. 4B, according to some embodiments.

FIG. 4C illustrates a side sectional view A-A of a configuration of a sensor assembly 350A, according to some embodiments. As can be seen, sonic sensor 150 includes a sonic transducer 401 (e.g., an ultrasonic transducer), which is covered by a cap 402 and separated from acoustic interface housing 450A by a membrane 403. Acoustic interface housing 450A encloses and/or defines an acoustic interface tube 405 (which may also be referred to as a "horn" an "acoustic tube" or simply "tube"). Acoustic interface tube 405 facilitates the travel of sonic signals, with a direction of travel represented by directional arrow 410, transmitted from sonic sensor 150 into upper opening 407 of the acoustic interface tube 405, through the length of acoustic interface tube 405, and out of acoustic opening port 406 toward surface 300. Acoustic interface tube 405, in some embodiments, similarly facilitates the travel of sonic signals (i.e., corresponding returned signals) with a direction of travel represented by directional arrow 411, returned from surface 300 into acoustic opening port 406 of the acoustic interface tube 405, through the length of acoustic interface tube 405, and out of upper opening 407 to be received by sonic sensor 150. It should be appreciated that the dimensions are presented only by way of example and that in other embodiments, for example, the diameter of the acoustic opening port 406 of acoustic interface tube 405 may be larger or smaller, or vary along the length (e.g., getting wider near acoustic opening port 406). Additionally, or alternatively, the length of acoustic interface tube 405 can also be varied (measured from upper opening 407 to acoustic opening port 406), in addition to the opening size of acoustic opening port 406 or the overall profile of acoustic interface tube 405. In some embodiments, dimensions of acoustic interface tube 405 may be selected to limit or enlarge an acoustic field of view of the sonic sensor 150. In some embodiments, the shape of acoustic opening port 406 may be other shapes besides circular.

In one example embodiment, the received returned signals (such as those indicated by arrow 411) are digitized. The digitization may be performed by a DSP on-board sonic sensor 150, by a sensor processor 130, by a host processor 110, or by another processor.

Additionally, FIG. 4C illustrates that one or more rings 497 may be defined in a slightly spaced-out distance from the acoustic opening port 406 of acoustic interface tube 405. The ring(s) are annular with respect to acoustic opening port 406. In some embodiments, when there is more than one defined ring 497, the rings are concentric with respect to one another. The rings 497 may be debossed (such as defined into, engraved into, etc.) or debossed (such as such as defined above, raised from, etc.) external surface 475. In FIG. 4C, the rings 497 are defined as debossed valleys 499 separated by ridges 498 which are level with external surface 475. The defined rings 497 (497-1 and 497-2 in FIG. 4C) operate to attenuate the acoustic pressure between device 100 (e.g., device 100A or 100B) and a nearby surface such as a floor and to attenuate direct path echoes. The valleys of the defined rings 497 cause them to differ in height from surface 475. There are two main paths for signals to travel from sensor 150 to sensor 150B, or vice versa: 1) sound exits acoustic opening port 406 which is associated with sensor 150, takes a sharp angle, travels along the bottom surface (e.g., external surface 475) of device 100, and enters the acoustic opening port 406B (see FIG. 4D) associated with sensor 150B—this is referred to as the "direct path" or a "direct path echo;" 2) sound exits acoustic opening port 406 associated with sensor 150, travels to the floor/surface (e.g., floor 300), and reflects back into acoustic opening port 406B associated with sensor 150B—this may be referred to as the "floor echo," surface echo," "indirect path," or "indirect path echo." The signal received via this indirect path, which includes primary returned signals and secondary (i.e., multipath) returned signals, will determine the characteristics of the floor and/or the presence/size/distance of a cliff. The defined rings 497 are designed to reduce the signal from path 1, the direct path, thereby increasing the overall floor signal from path 2 (the indirect path) by effectively increasing the Signal to Noise Ratio (SNR) of signals received via the second path. By reducing signal path 1, in comparison to an embodiment without defined rings, direct echo path reduction is accomplished versus the amount of direct echo experienced in a similar configuration but without use of defined rings. In some cases, the amount of reduction of direct path echoes may be as high as 25%; in some cases the amount of reduction in direct path echoes may be as high as 50%.

Figure 7:
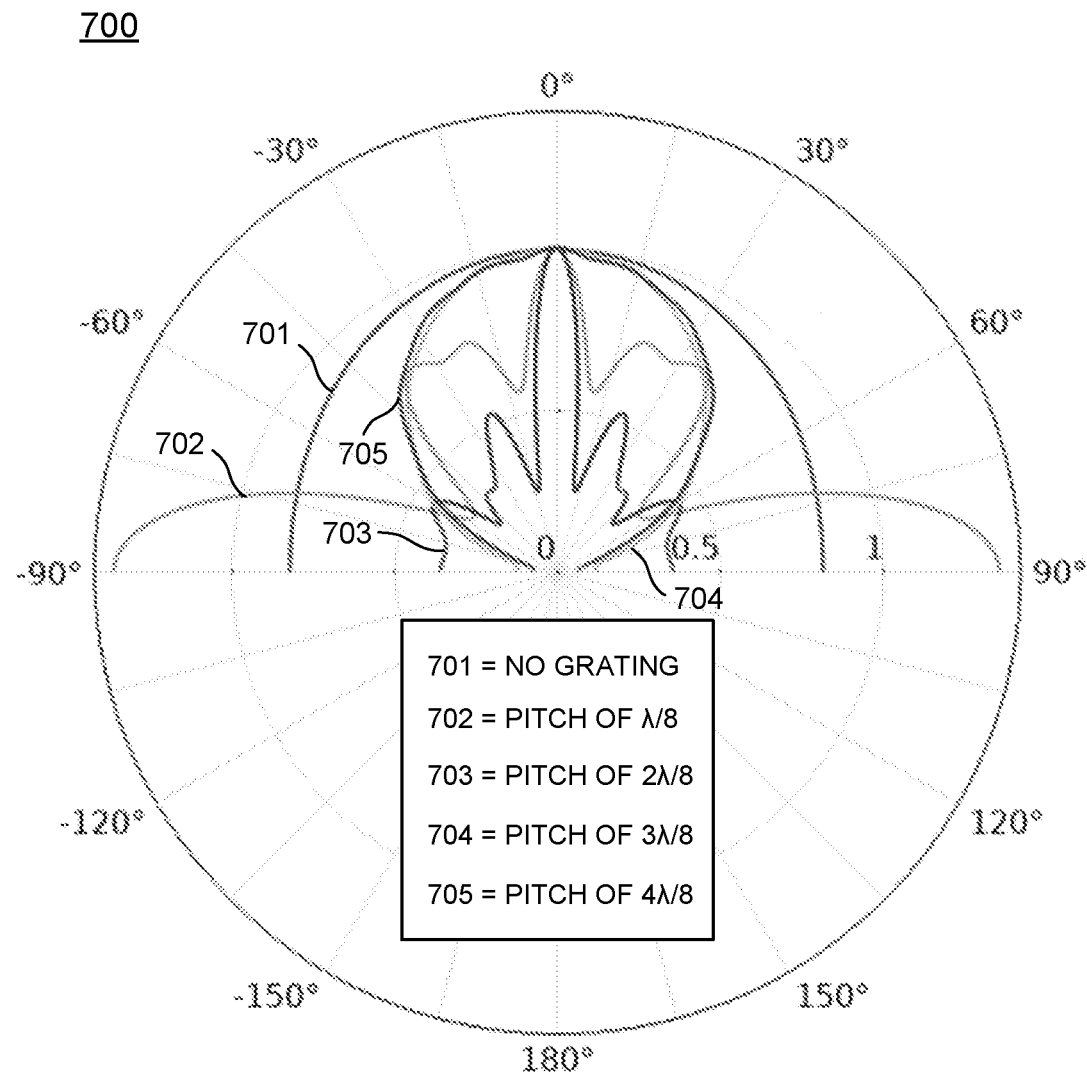
FIG. 7 illustrates a polar graph of several examples of beam shapes which may be implemented via some example configurations of rings defined annularly around one or more an acoustic opening ports of a sensor assembly, according to various embodiments.

In the depicted embodiment, a plurality of defined rings 497 (e.g., each defined by a trough/valley 499 and a ridge 498) are illustrated. Advantages of decreased direct path echo and increased amplitude (especially when sensing hard floors such as wood, tile, or vinyl) are obtained with a single defined ring 497-1. These advantages improve slightly and may be tuned by adding additional rings defined rings (e.g., defined ring 497-2) spaced annularly and concentrically outward from the first ring 497-1. Two debossed rings 497 (497-1 and 497-2) are depicted, but other embodiments may employ a greater or lesser number of debossed rings. For example, in some embodiments there may be a single debossed ring while in others there may be two, five, ten, fifteen, twenty, or some other number which is limited by available space on surface 475 and the pitch of rings 497. When two or more defined rings are employed, they may be referred to as a grate or a grating. The rings/grating (and the edges thereof) create additional reflections of the ultrasonic waves and therefore result in interference patterns that can shape the beam (outgoing and incoming). Thus, the defined rings, which may be referred to as a grating, can be designed to shape the ultrasonic beam in an optimal manner for the applications mentioned herein. FIG. 7 illustrates a polar graph of some example beam shapes associated with particular ring configurations. Moreover, these defined rings/grating in the surrounding of the ultrasonic transducer's acoustic opening port maybe applied in any application that benefits from the beam shaping that occurs as a result of the defined rings/gratings. It should also be mentioned that although, as depicted, the transducer of sensor 150 is recessed below the surface, in other applications the transducers may be positioned in any desired way with respect to the sensor assembly 350A.

Another application of the defined rings 497, is that they can be tuned to reduce the sensor's (150/150B) performance sensitivity to nearby features (e.g., features in the acoustic interface housing 450A or housing 201 or the device 100). The physical mechanism is the same as use in the reduction in direct transmission between sensors but is more generalized. For example, nearby features such as a screw hole/step/seam/etc. in the housing 201, or even another nearby sensor, can all alter the acoustic field of sensor 150 and therefore its performance. Design of the defined rings/grating can mitigate these types of effects by reducing received signals which have interacted with these nearby features.

The separation between defined rings is typically very small, such as between 0.5 mm and 2 mm—a measurement associated with the width of a ridge 498 between adjacent valleys 499. In some embodiments, for example, the separation may be about 1mm between defined rings and between the acoustic opening port 406 and the closest defined valley 499. In some embodiments, depth of the valley/trough 499 of defined ring(s) 497 is very shallow, such as being a partial fraction of the separation distance. For example, the depth may be between 0.1 mm and 0.5 mm. In some embodiments, the depth of at least some of the valleys 499 may be approximately 0.3 mm. In some embodiments, the depth is at or between 0.1 and 1.0 wavelengths of the frequency of the sound emitted by the sensor 150, which in typical ultrasonic sensors would be between 0.1 mm and 2.0 mm. The width of a valley 499 may be similar to the separation (e.g., the width of a ridge 498) between valleys 499.

It should be appreciated that the pitch (the width of a valley 499+a ridge 498), separation between defined rings 497 themselves, width of valleys, width of ridges, and/or a distance between the acoustic opening port 406 and the nearest defined ring 497 may be adjusted for different operating frequencies of sonic sensor 150. In this manner, the grating made of a plurality of defined rings is tunable. The pitch selected for the defined rings 497 in a grating may be a function of the operating frequency of the sonic sensor 150. For example, the pitch may be ⅛ wavelength, ¼ wavelength, ⅜ wavelength, ½ wavelength, or some other partial fraction of a wavelength of the operating frequency of the sonic sensor 150. Different pitches may be utilized to attenuate or accentuate pressure in different axes of the sonic signal (e.g., to the front, to the sides, at desired angles). In this manner, a variety of beam patterns may be effectuated by grating composed of a plurality of defined rings.

Figure 4D:
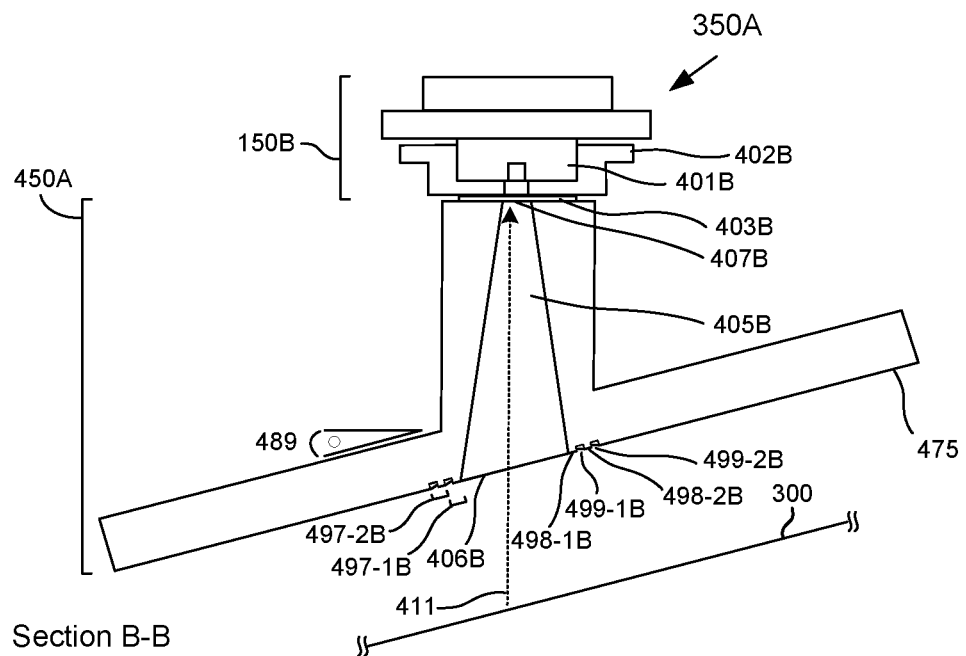
FIG. 4D illustrates a second side sectional view of a configuration of the sensor assembly of FIG. 4B, according to some embodiments.

FIG. 4D illustrates a side sectional view B-B of a configuration of a sensor assembly 350A, according to some embodiments. As can be seen, sonic sensor 150B includes a sonic transducer 401B (e.g., an ultrasonic transducer), which is covered by a cap 402B and separated from acoustic interface housing 450A by a membrane 403B. Acoustic interface housing 450A encloses and/or defines an acoustic interface tube 405B (which may also be referred to as a "horn" an "acoustic tube" or simply "tube"). In some embodiments, horn 405B is substantially parallel (e.g., within manufacturing error) to horn 405 and has the same tilt angle and, when installed in a device 100, both are pointed in a direction designated as the front of device 100. Acoustic interface tube 405B facilitates the travel of sonic signals, with a direction of travel represented by directional arrow 411, returned from surface 300 into acoustic opening port 406B of the acoustic interface tube 405B, through the length of acoustic interface tube 405B, and out of upper opening 407B to be received by sonic sensor 150B. It should be appreciated that the dimensions are presented only by way of example and that in other embodiments, for example, the diameter of the acoustic opening port 406B of acoustic interface tube 405B may be larger or smaller, or vary along the length (e.g., getting wider near acoustic opening port 406B). Additionally, or alternatively, the length of acoustic interface tube 405B can also be varied (measured from upper opening 407B to acoustic opening port 406B), in addition to the opening size of acoustic opening port 406 or the overall profile of acoustic interface tube 405B. In some embodiments, dimensions of acoustic interface tube 405 may be selected to limit or enlarge an acoustic field of view of the sonic sensor 150B. In some embodiments, the shape of acoustic opening port 406B may be other shapes besides circular.

In FIG. 4D, defined rings 497 (497-1B and 497-2B) are disposed annularly around acoustic opening port 406B in a concentric arrangement with respect to one another. Defined ring 497-1B comprises a valley 499-1B and a ridge 498-1B, while defined ring 497-2 comprises a valley 499-2B and a ridge 498-2B.

Figure 4E:
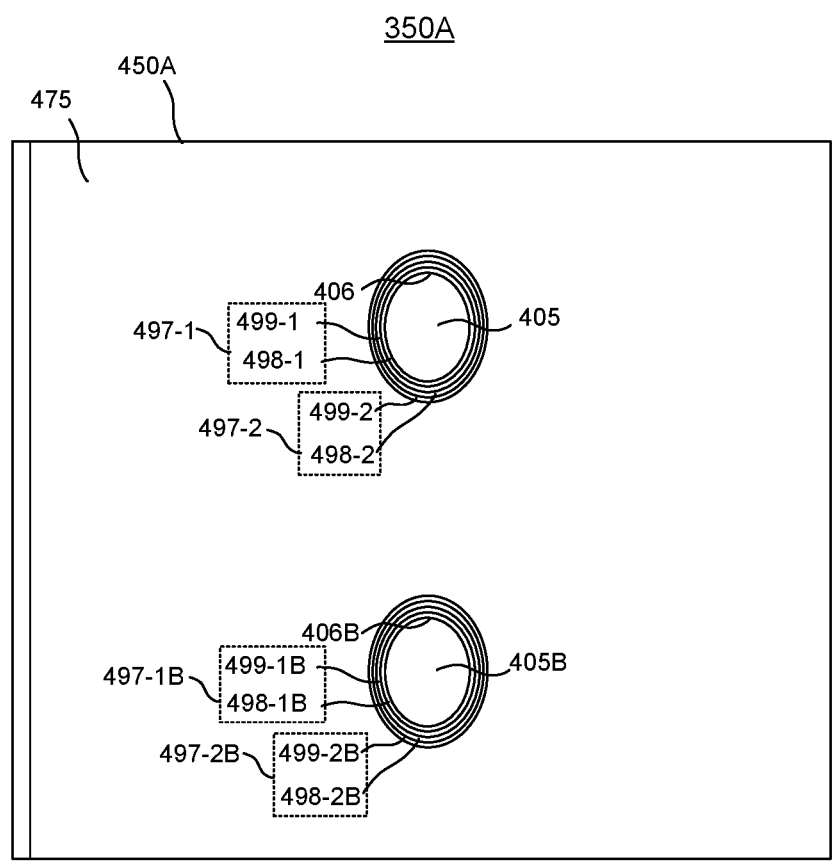
FIG. 4E illustrates a bottom plan view of a configuration of the sensor assembly of FIG. 4A, according to some embodiments.

FIG. 4E illustrates a bottom plan view of a configuration of the sensor assembly 350A, according to some embodiments. Acoustic opening ports 406 and 406B are circular but appear to be oval in shape due the tilt of bottom surface 475. Likewise, defined rings 497-1, 497-2, 497-1B, and 497-2B appear oval in shape due to the tilt illustrated in this view.

Figure 4F:
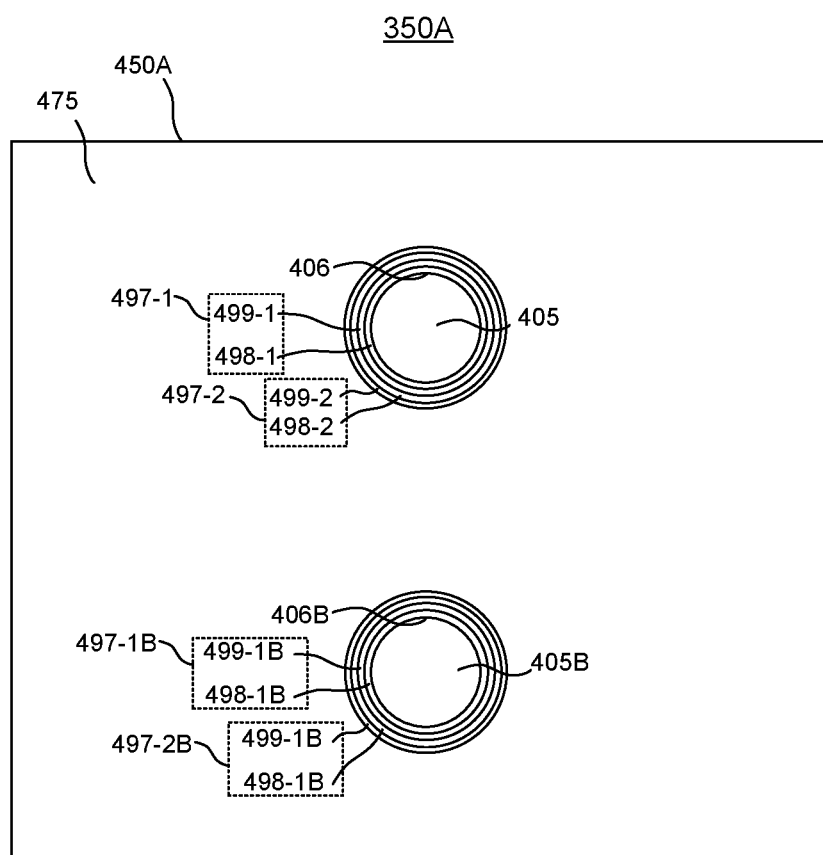
FIG. 4F illustrates a straight on bottom view (where the viewpoint is taken orthogonal to the bottom surface) of a configuration of the sensor assembly of FIG. 4A, according to some embodiments.

FIG. 4F illustrates a straight on bottom view (where the viewpoint is taken orthogonal to the bottom surface 475) of a configuration of the sensor assembly 350A, according to some embodiments. In this view, with the tilt removed from the view, it can be seen that openings 406 and 406B are circular. Likewise, after removing the tilt from this view, it can be seen that defined rings 497-1, 497-2, 497-1B, and 497-2B are circular and spaced outward from their respective acoustic opening ports (406 and 406B). Although the rings 497 depicted around opening 406 and 406B are equal in number, this is not a requirement. In some embodiments, annular rings 497 around opening 406 and annular rings 497 around opening 406B are equal in number, height (from valley to ridge), and pitch.

Though depicted as circular, various other shapes and configurations of the defined rings 497 may be utilized. The pattern of a defined ring may be symmetric or non-symmetric and may take any suitable form to achieve the desired attenuation.

Although the illustrated acoustic interface housing 450A provided a tilt angle 489 (with respect to a floor surface) for sensors 150, in some embodiments the acoustic interface housing 450A may provide for no tilt angle away from orthogonal to surface 300. That is, in some embodiments, the sensor(s) 150 may be aimed vertically toward the expected location of a floor. Such an example is illustrated in FIGS. 6A-6D. As is depicted in FIGS. 6A-6D, one or more defined rings may be employed in a similar fashion about the opening to the tube/horn of the acoustic interface housing 450A to similar effect (i.e., reduced direct transmission and increased amplitude from received returned signals).

Figure 5A:
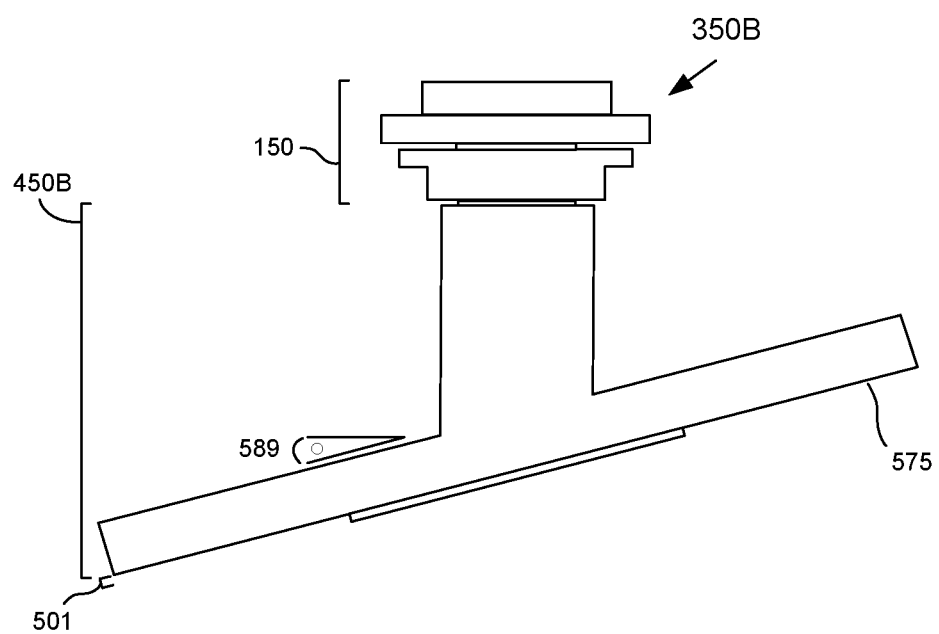
FIG. 5A illustrates a side elevational view of one example sensor assembly, with embossed rings defined in an external surface, which may be utilized on a device to transmit sonic signals and receive returned sonic signals, in accordance with various embodiments.

FIG. 5A illustrates a side elevational view of one example sensor assembly 350B, with embossed rings defined in an external surface 575, which may be utilized on a device 100 to transmit sonic signals and receive returned sonic signals, in accordance with various embodiments. It should be appreciated that sensor assembly 350B is similar to and shows some alternative embodiments and features to those shown in sensor assembly 350A. One difference is region 501 which is raised or embossed from surface 575 and within which one or more rings 597 (see e.g., FIG. 5C) are defined. External surface 575 is designed to oriented in device 100 such that it is parallel to surface 300 upon which device 100 operates.

Sensor assembly 350B includes at least a sonic sensor 150 and typically includes two sonic transducers (150 and 150B). An acoustic interface housing 450B, which encloses and/or defines an acoustic interface tube 505, in the form of a tube, cavity, horn, or some combination thereof, is included and coupled with sonic sensor 150. In some embodiments, acoustic interface housing 450B may position sonic sensor(s) 150 (e.g., 150 and 150B) at an orthogonal angle with respect to a surface it is detecting (i.e., a floor). In some embodiments, as depicted in FIGS. 6A-6D, acoustic interface housing 450B may position sonic sensor(s) 150 (e.g., 150 and 150B) at a non-orthogonal tilt angle 589 with respect to a surface it is detecting (i.e., a floor). By tilting sensor(s) 150, it/they may sense farther in advance of the direction of forward travel of device 100 than if it/they were orthogonal with the expected location of the floor (i.e., pointed straight down at the floor). In some embodiments, the angle of tilt 589 from orthogonal may be in the range of greater than 0 degrees from orthogonal and up to 30 degrees from orthogonal. In some embodiments, the angle of tilt 589 may be between about 10 from orthogonal and about 20 degrees from orthogonal. In some embodiments, the angle of tilt 589 is approximately 15 degrees from orthogonal to the floor (e.g., floor 300) or other flat surface beneath device 100. Within the range of tilt angles, a smaller angle from orthogonal increases the amplitude of returned signals (more accurate floor type determination), but also increases the latency associated with detecting the edge of a cliff in front of device 100 in the direction of travel of device 100. Within the range of tilt angles, a larger angle from orthogonal decreases the amplitude of returned signals as they tend to scatter more, but also decreases the latency associated with detecting the edge of a cliff. For example, in some embodiments where the angle of tilt 589 is around 15 degrees, there is good balance between amplitude of returned signals from a surface below device 100 and reduced latency of cliff detection in front of device 100 in the forward direction of travel of device 100. The tilt angle 589 for an application/device may be adapted to the desired specification of the device and to the design characteristics of the complete device (e.g., size, height, distance to floor, speed of movement, cliff detection and/or depth estimation latency desired/required). In some embodiments, the title angle may be adjustable automatically depending on application or context.

In some embodiments, a plurality of sensors 150 (e.g., 150 and 150B) may be employed in an acoustic interface housing 450B (or different housings) which facilitate different tilt angles for at least two of the sensors 150. In such an embodiment, a sensor with a shallow tilt angle from vertical (i.e., orthogonal to floor 300) affords better (greater) amplitude while a sensor with a greater angle of tilt from vertical provides better (less) latency in cliff detection.

In some embodiments, the sensor assembly 350B is coupled with a device housing 201 (or other portion of device 100) such that it transmits the sonic signals in a direction toward which a surface is expected to be encountered or operated upon (e.g., downward toward a floor surface). For example, in a floor vacuum or robotic floor cleaning embodiment of device 100, a sensor assembly 350B may be disposed on or configured to sense outward from the bottom of device 100 in the manner illustrated in FIG. 3, such that transmitted sonic signals are directed toward a floor surface 300 below and in front of device 100 when device 100 is in operation. As described in FIGS. 1A and 1B a sonic sensor 150 (e.g., 150, 150B) may also be coupled with a host processor 110 or a sensor processor, in some embodiments, either or both of which operate to process and make determinations based upon received returned signals such as detecting surface types and/or detecting cliffs.

Figure 5B:
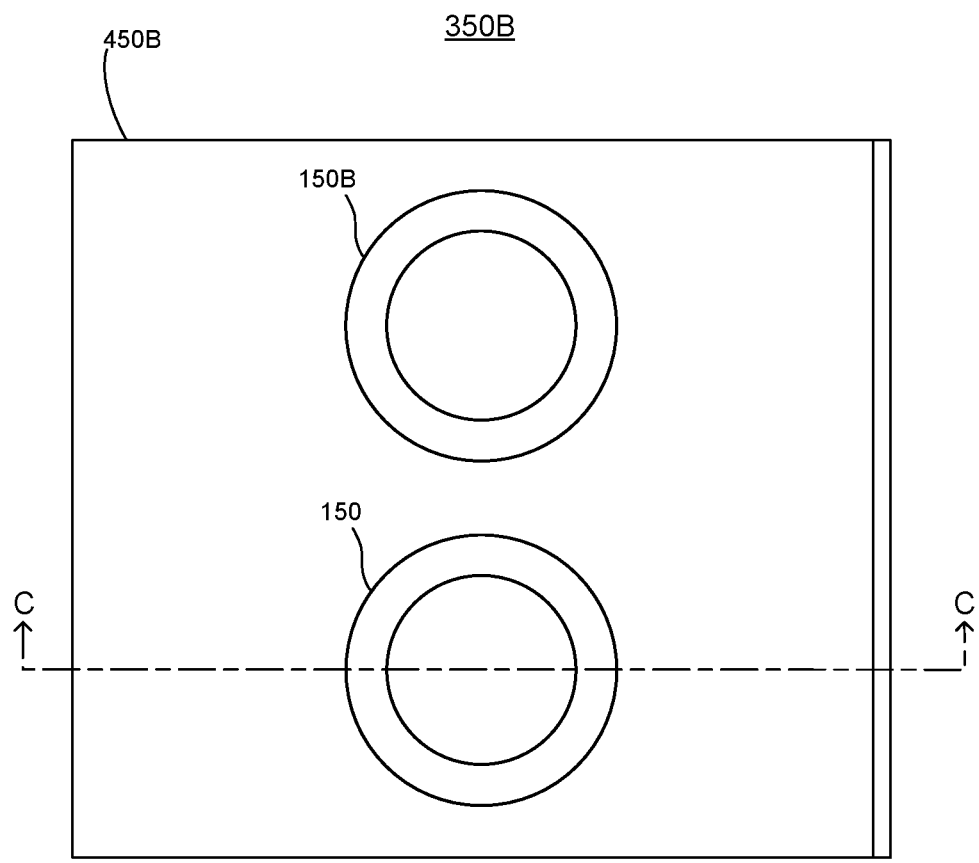
FIG. 5B illustrates a top view of the sensor assembly of FIG. 5A, in accordance with various embodiments.

FIG. 5B illustrates a top view of the sensor assembly 350B of FIG. 5A, in accordance with various embodiments. Section line C-C marks the location and orientation associated with sectional views illustrated in FIG. 5C. In the depicted embodiment, two sensors 150 are used, where sensor 150 may transmit while sensor 150B receives, or vice versa. In other embodiments, a single sensor 150 may be utilized to both transmit and then receive its own returned signals. Likewise, in some embodiments, sensor 150 may both emit and then receive its own returned signals, with sensor 150B both emitting and receiving its own returned signals—in such an embodiment sensor 150 and sensor 150B may sense using different frequencies.

Figure 5C:
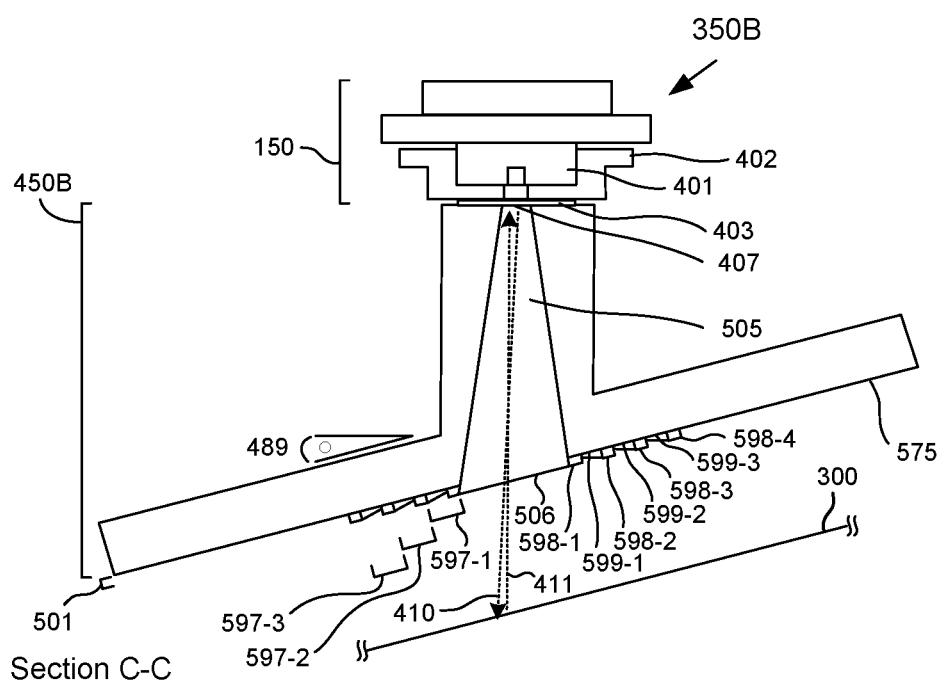
FIG. 5C illustrates a side sectional view of a configuration of the sensor assembly of FIG. 5B, according to some embodiments.

FIG. 5C illustrates a side sectional view C-C of a configuration of a sensor assembly 350B, according to some embodiments. Like numbered items are the same or similar to those previously described in conjunction with FIG. 4C. Acoustic interface housing 450B is similar to housing 450A and encloses and/or defines an acoustic interface tube 505 (which may also be referred to as a "horn" an "acoustic tube" or simply "tube"). Acoustic interface tube 505 is similar to tube 405 and acoustic opening port 506 is similar to port 406. In general, the operation of acoustic interface housing 450B is similar to that of housing 450A, except that the rings 597 disposed around acoustic opening port 506 are embossed (i.e., defined in a fashion that raises them from surface 575) rather than debossed/engraving them into the surface as depicted in FIG. 4C. Three embossed rings 597 (597-1, 597-2, and 597-3) are depicted, but other embodiments may employ a greater or lesser number of embossed rings. For example, in some embodiments there may be a single embossed ring while in others there may be two, five, ten, fifteen, twenty, or some other number which is limited by available space on surface 575 and the pitch of rings 597. As depicted, rings 597 each have a ridge 598 and a valley 599. For example: ring 597-1 comprises ridge 598-1 and trough/valley 599-1; ring 597-2 comprises ridge 598-2 and valley 599-2; ring 597-3 comprises ridge 598-3 and valley 599-3. Additionally, the outer edge of ring 597-3 is further defined by ridge 598-4. The ridges of the defined rings 597 cause them to differ in height from surface 575. The pitch of the rings may be measured from a leading edge of a ridge to the leading edge of a consecutive ridge or may be measured as the width of a ridge plus the width of a valley for a ring. In the depicted example, the ridges 598 are narrower in width than the valleys 599. In some embodiments, this relationship may be swapped with the ridges being wider than the valleys, while in other embodiments the ridges and valleys may be of the same width. It should be appreciated that a similar configuration of rings to that shown in FIG. 5C may be implemented as embossed rings or as debossed rings.

FIG. 5C illustrates that one or more rings 597 may be defined in a slightly spaced-out distance from the acoustic opening port 506 of acoustic interface tube 505. The ring(s) are annular with respect to acoustic opening port 506. In some embodiments, when there is more than one defined ring 597, the rings are concentric with respect to one another.

Another application of the defined rings 597, is that they can be tuned to reduce the sensor's (150/150B) performance sensitivity to nearby features (e.g., features in the acoustic interface housing 450B or housing 201 or the device 100). The physical mechanism is the same as used in the reduction in direct transmission between sensors but is more generalized. For example, nearby features such as a screw hole/step/seam/etc. in the housing 201, or even another nearby sensor, can all alter the acoustic field of sensor 150 and therefore its performance. Design of the defined rings/grating can mitigate these types of effects by reducing received signals which have interacted with these nearby features.

The dimensions of a defined ring and separation between defined rings (when more than one is employed around an acoustic opening port) is typically very small, as has previously been described, and dimensions are similar or in the same ranges as described with respect to rings 497 of FIG. 4C.

It should be appreciated that the pitch (the width of a valley 599+a ridge 598), or separation between defined rings 597 themselves and/or between the acoustic opening port 506 and the nearest defined ring 597 may be adjusted for different operating frequencies of sonic sensor 150. In this manner, the grating made of a plurality of defined rings 597 is tunable. The pitch selected for the defined rings 597 in a grating may be a function of the operating frequency of the sonic sensor 150. For example, the pitch may be ⅛ wavelength, ¼ wavelength, ⅜ wavelength, ½ wavelength, or some other partial fraction of a wavelength of the operating frequency of the sonic sensor 150. Different pitches may be utilized to attenuate or accentuate pressure in different axes of the sonic signal (e.g., to the front, to the sides). In this manner, a variety of beam patterns may be effectuated by grating composed of a plurality of defined rings.

Figure 5D:
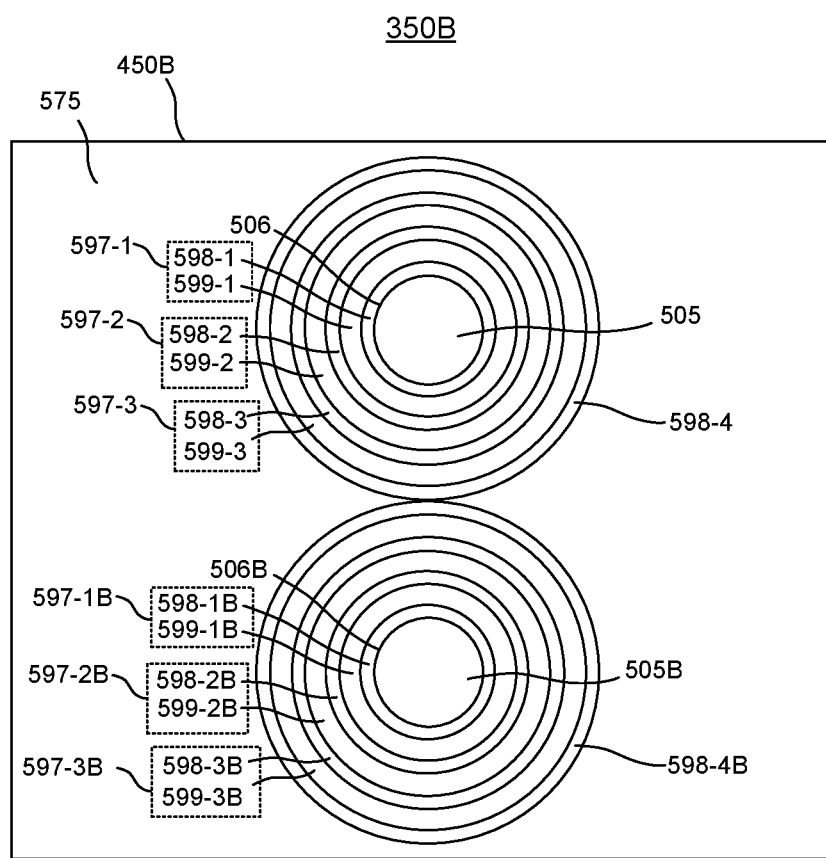
FIG. 5D illustrates a straight on bottom view (where the viewpoint is taken orthogonal to the bottom surface) of a configuration of the sensor assembly of FIG. 5A, according to some embodiments.

FIG. 5D illustrates a straight on bottom view (where the viewpoint is taken orthogonal to the bottom surface 575) of a configuration of the sensor assembly 350B of FIG. 5A, according to some embodiments. In this view, with the tilt removed from the view, it can be seen that openings 506 and 506B are circular. Opening 506B is the opening of a horn 505B, which is substantially parallel (e.g., within manufacturing error) to horn 505 and has the same tilt angle, in some embodiments; and when installed in a device 100, both are pointed in a direction designated as the front of device 100. Likewise, after removing the tilt from this view, it can be seen that defined rings 597-1, 597-2, 597-3, 597-1B, 597-2B, and 597-3B are circular and spaced concentrically outward from their respective acoustic opening ports (406 and 406B). Ring 597-1B comprises ridge 598-1B and trough/valley 599-1B; ring 597-2B comprises ridge 598-2B and valley 599-2B; ring 597-3B comprises ridge 598-3B and valley 599-3B. Additionally, in the described embodiment, the outer defining ridges (ridges 598-4 and 598-4B) of rings 597-3 and 597-3B are tangent to one another. In a similar fashion, the outer valleys of embossed or debossed rings may be tangent to one another, in some embodiments.

Though depicted as circular, various other shapes and configurations of the defined rings 597 may be utilized. The pattern of a defined ring may be symmetric or non-symmetric and may take any suitable form to achieve the desired attenuation. Although the rings 597 depicted around opening 506 and 506A are equal in number, this is not a requirement. In some embodiments, annular rings 597 around opening 506 and annular rings 597 around opening 506B are equal in number, height (from valley to ridge), and pitch.

Although the illustrated acoustic interface housing 450B provided a tilt angle 589 (with respect to a floor surface) for sensors 150, in some embodiments the acoustic interface housing 450B may provide for no tilt angle away from orthogonal to surface 300. That is, in some embodiments, the sensor(s) 150 may be aimed vertically toward the expected location of a floor. Such an example is illustrated in FIGS. 6A-6D.

Figure 6A:
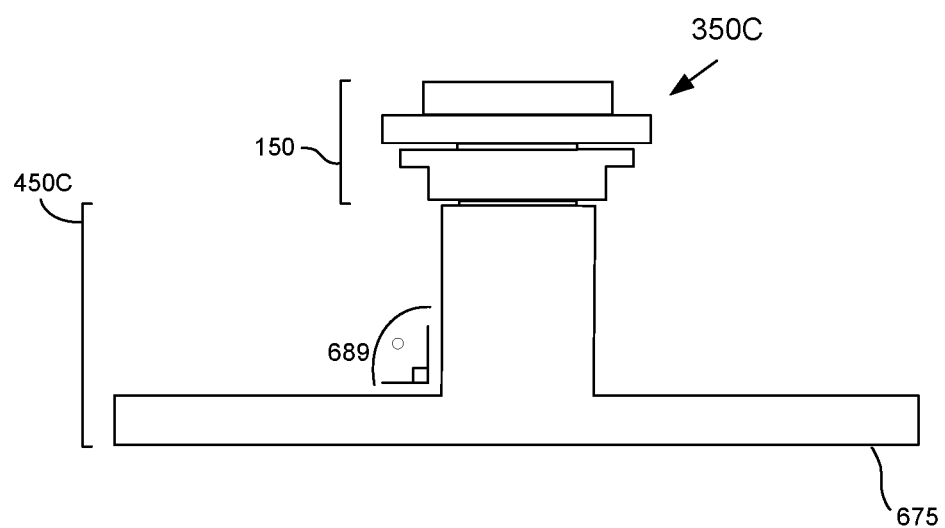
FIG. 6A illustrates a side elevational view of one example sensor assembly, with debossed rings defined in an external surface, which may be utilized on a device to transmit sonic signals and receive returned sonic signals, in accordance with various embodiments.

FIG. 6A illustrates a side elevational view of one example sensor assembly 350C, with debossed rings defined in an external surface 675, which may be utilized on a device 100 to transmit sonic signals and receive returned sonic signals, in accordance with various embodiments. It should be appreciated that sensor assembly 350C is similar to and shows some alternative embodiments and features to those shown in sensor assembly 350A and sensor assembly 350B. External surface 675 is designed to oriented in device 100 such that it is parallel to surface 300 upon which device 100 operates.

Sensor assembly 350C includes at least a sonic sensor 150 and typically includes two sonic transducers (150 and 150B). An acoustic interface housing 450C, which encloses and/or defines an acoustic interface tube 605, in the form of a tube, cavity, horn, or some combination thereof, is included and coupled with sonic sensor 150. In some embodiments, as depicted in FIGS. 6A-6D, acoustic interface housing 450C may position sonic sensor(s) 150 (e.g., 150 and 150B) at an orthogonal angle 689 with respect to a surface it is detecting (i.e., a floor). In some embodiments, acoustic interface housing 450C may alternatively position sonic sensor(s) 150 (e.g., 150 and 150B) at a non-orthogonal tilt angle with respect to a surface it is detecting (i.e., a floor) in the manner previously described and discussed with respect to acoustic interface housings 450A and 450B. In some embodiments, when a tilt angle from orthogonal is employed, the tilt angle for an application/device may be adapted to the desired specification of the device and to the design characteristics of the complete device (e.g., size, height, distance to floor, speed of movement, cliff detection and/or depth estimation latency desired/required). In some embodiments, the title angle may be adjustable automatically depending on application or context.

In some embodiments, a plurality of sensors 150 (e.g., 150 and 150B) may be employed in an acoustic interface housing 450C (or different housings) which facilitate different tilt angles for at least two of the sensors 150. In such an embodiment, a sensor with a shallow tilt angle from vertical (i.e., orthogonal to floor 300) affords better (greater) amplitude while a sensor with a greater angle of tilt from vertical provides better (less) latency in cliff detection.

In some embodiments, the sensor assembly 350C is coupled with a device housing 201 (or other portion of device 100) such that it transmits the sonic signals in a direction toward which a surface is expected to be encountered or operated upon (e.g., downward toward a floor surface). For example, in a floor vacuum or robotic floor cleaning embodiment of device 100, a sensor assembly 350C may be disposed on or configured to sense outward from the bottom of device 100 in the manner illustrated in FIG. 3, such that transmitted sonic signals are directed toward a floor surface 300 below device 100 when device 100 is in operation. As described in FIGS. 1A and 1B a sonic sensor 150 (e.g., 150, 150B) may also be coupled with a host processor 110 or a sensor processor, in some embodiments, either or both of which operate to process and make determinations based upon received returned signals such as detecting surface types and/or detecting cliffs.

Figure 6B:
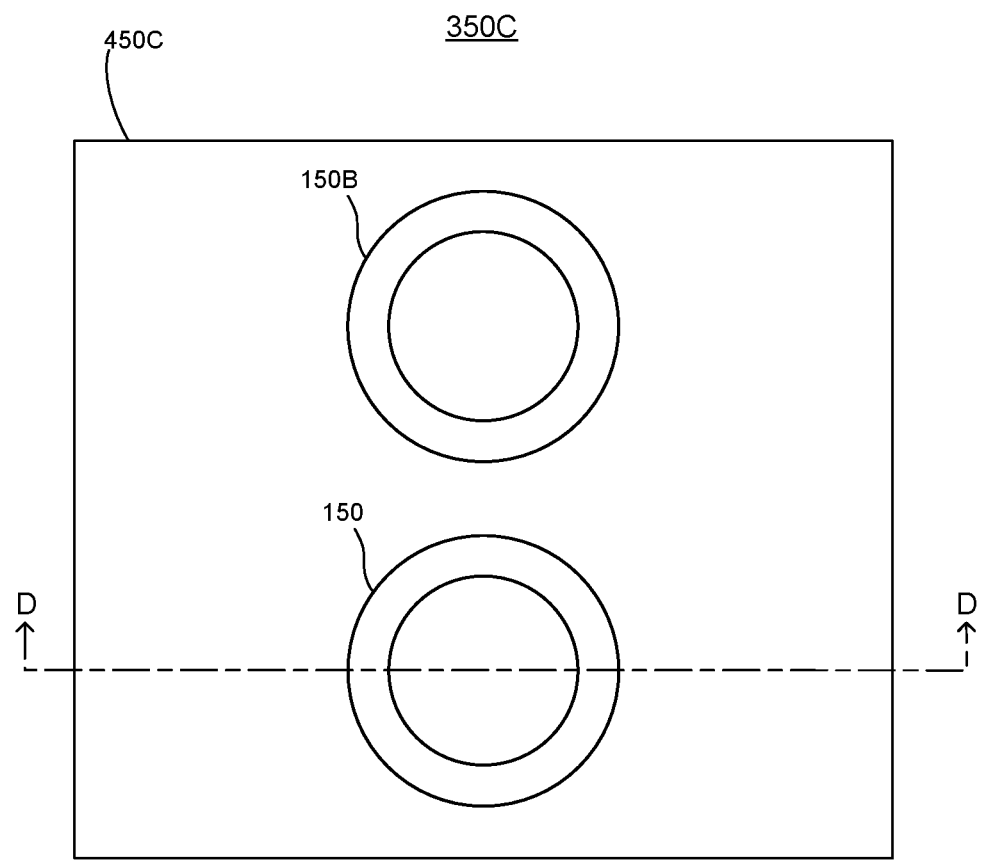
FIG. 6B illustrates a top view of the sensor assembly of FIG. 6A, in accordance with various embodiments.

FIG. 6B illustrates a top view of the sensor assembly 350C of FIG. 6A, in accordance with various embodiments. Section line D-D marks the location and orientation associated with sectional views illustrated in FIG. 6C. In the depicted embodiment, two sensors 150 are used, where sensor 150 may transmit while sensor 150B receives, or vice versa. In other embodiments, a single sensor 150 may be utilized to both transmit and then receive its own returned signals. Likewise, in some embodiments, sensor 150 may both emit and then receive its own returned signals, with sensor 150B both emitting and receiving its own returned signals—in such an embodiment sensor 150 and sensor 150B may sense using different frequencies.

Figure 6C:
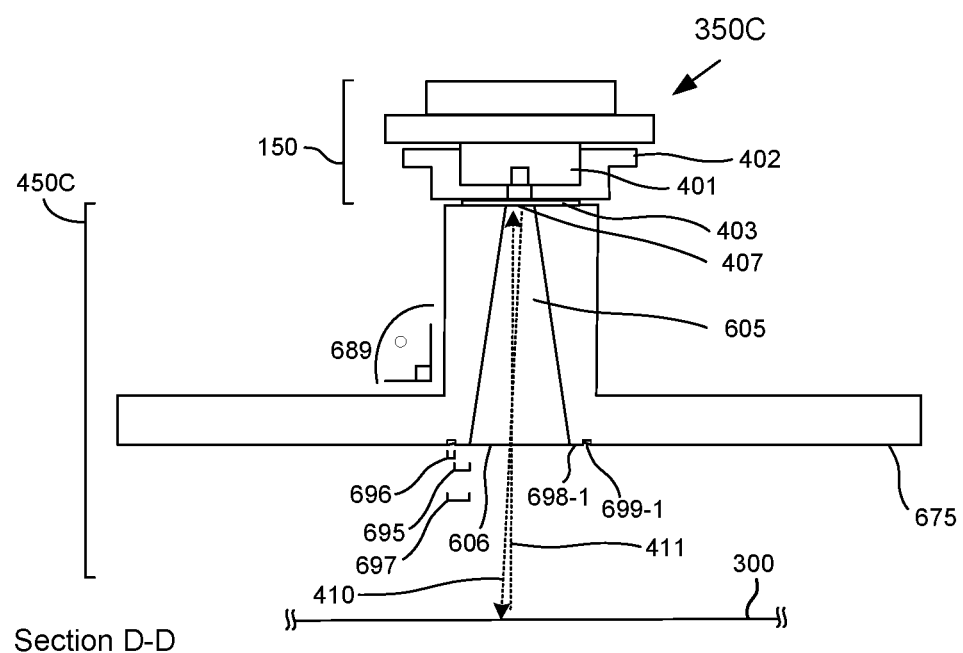
FIG. 6C illustrates a side sectional view of a configuration of the sensor assembly of FIG. 6B, according to some embodiments.

FIG. 6C illustrates a side sectional view D-D of a configuration of a sensor assembly 350C, according to some embodiments. Like numbered items are the same or similar to those previously described in conjunction with FIG. 4C and 5C. Acoustic interface housing 450C is similar to housings 450A and 450B and encloses and/or defines an acoustic interface tube 605 (which may also referred to as a "horn" an "acoustic tube" or simply "tube"). Acoustic interface tube 605 is similar to tubes 405 and 505 and acoustic opening port 606 is similar to ports 406 and 506. In general, the operation of acoustic interface housing 450C is similar to that of housings 450A and 450B, except that only a single defined ring 697-1 is disposed around acoustic opening port 606. Although one debossed ring 697-1 is depicted, other embodiments may employ a greater number of debossed rings such as 2, 3, 4, 5, 10, 15, 20, or some other number limited by space on surface 675 and ring pitch if more than one ring 697 is employed. As depicted, ring 697-1 has a ridge 698-1 and a valley 699-1. The pitch of the ring may be measured as the width of a ridge plus the width of a valley for a ring. In the depicted example, the ridge 698-1 is greater in width than the valley 699-1. In some embodiments, this relationship may be swapped with the valley being wider than the ridge, while in other embodiments the ridge and valley may be of the same width. Although shown as being debossed, ring 697-1 may similarly be embossed.

FIG. 6C illustrates that one or more rings 697 may be defined in a slightly spaced-out distance from the acoustic opening port 606 of acoustic interface tube 605. The ring(s) are annular with respect to acoustic opening port 606. In some embodiments, when there is more than one defined ring 697, the rings are concentric with respect to one another. Ring(s) 697 can be employed in the same manner as previously described with respect to rings 497 and 597. In some embodiments, annular ring(s) 697 around opening 606 and annular ring(s) 697 around opening 606B are equal in number, height (from valley to ridge), and pitch.

The dimensions of a defined ring and separation between defined rings (when more than one is employed around an acoustic opening port) is typically very small, as has previously been described, and dimensions are similar or in the same ranges as described with respect to rings 497 of FIG. 4C.

It should be appreciated that the pitch (the width of a valley 699+a ridge 698), or separation between defined rings 597 themselves, and/or a distance between the acoustic opening port 606 and the nearest defined ring 697 may be adjusted for different operating frequencies of sonic sensor 150. In this manner, the grating made of a one or a plurality of defined rings 697 is tunable. The pitch selected for the defined ring(s) 697 in a grating may be a function of the operating frequency of the sonic sensor 150. For example, the pitch may be ⅛ wavelength, ¼ wavelength, ⅜ wavelength, ½ wavelength, or some other partial fraction of a wavelength of the operating frequency of the sonic sensor 150. Different pitches may be utilized to attenuate or accentuate pressure in different axes of the sonic signal (e.g., to the front, to the sides). In this manner, a variety of beam patterns may be effectuated by grating composed of a plurality of defined rings.

Figure 6D:
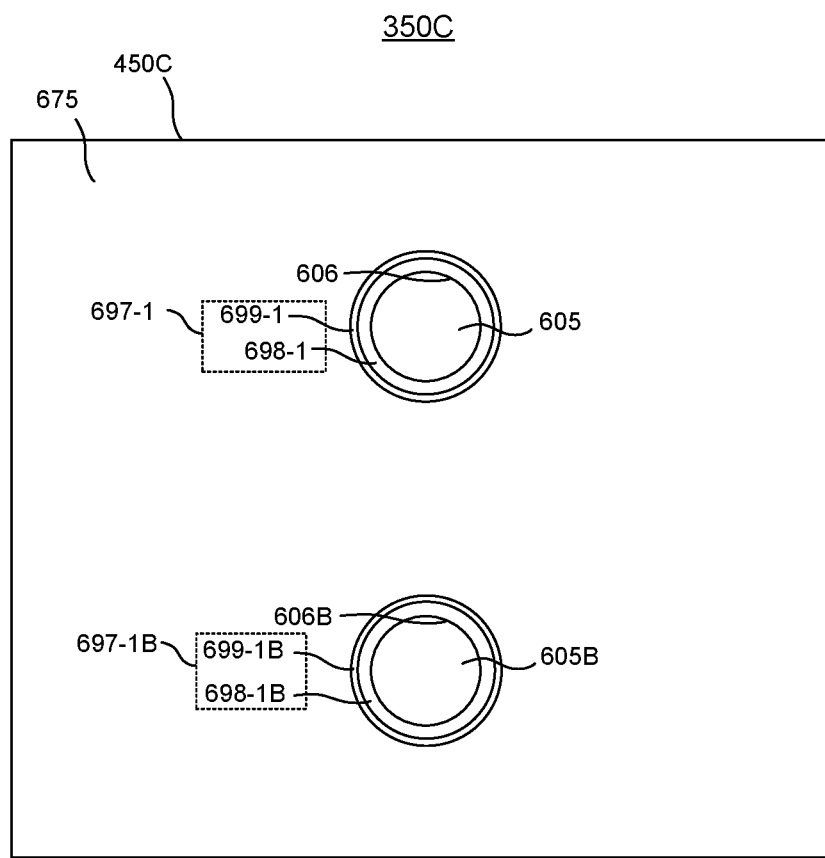
FIG. 6D illustrates a straight on bottom view (where the viewpoint is taken orthogonal to the bottom surface) of a configuration of the sensor assembly of FIG. 6A, according to some embodiments.

FIG. 6D illustrates a straight on bottom view (where the viewpoint is taken orthogonal to the bottom surface 675) of a configuration of the sensor assembly 350C of FIG. 6A, according to some embodiments. In this view openings 606 and 606B are visibly circular. Opening 606B is the opening of a horn 605B which is substantially parallel (e.g., within manufacturing error) to horn 605 and has the same tilt angle, in some embodiments; and when installed in a device 100, both are pointed in a direction designated as the front of device 100. Likewise, defined rings 697-1 and 697-1B are also circular spaced concentrically outward from their respective acoustic openings (606 and 606B). Ring 697-1B comprises ridge 698-1B and trough/valley 699-1B.

Though depicted as circular, various other shapes and configurations of the defined rings 697 may be utilized. The pattern of a defined ring may be symmetric or non-symmetric and may take any suitable form to achieve the desired attenuation.

Although the illustrated acoustic interface housing 450C provided no tilt angle from orthogonal (with respect to a floor surface) for sensors 150, in some embodiments the acoustic interface housing 450C may provide for some tilt angle away from orthogonal to surface 300.

FIG. 7 illustrates a polar graph 700 several examples of beam shapes which may be implemented via some example configurations of rings defined annularly around one or more an acoustic opening ports of a sensor assembly. Such beam shaping may be employed with a transmitting sonic sensor and/or with a receiving sonic sensor. For purposed of example, and not of limitation, consider that the graph 700 illustrates gratings which include 10 defined rings that are spaced as a function of the wavelength, $\lambda$, of the sonic signal being transmitted or received as corresponding returned signals. For example: beam shape 701 is smooth and is associated with no grating (i.e., no defined rings of the type described herein); beam shape 702 has a narrow forward lobe at 0 degrees, two narrow side lobes (at about +90 degrees and −90 degrees), and two additional side lobes (centered at about +30 degrees and −30 degrees), and is associated with a grating having a pitch of $\lambda/8$; beam shape 703 has a very narrow forward lobe at 0 degrees and small side lobes (at about +25 degrees, +60 degrees, −25 degrees, and −60 degrees), and is associated with a grating having a pitch of $2\lambda/8$; beam shape 704 has a somewhat circular forward lobe centered at 0 degrees, and is associated with a grating having a pitch of $3\lambda/8$; and beam shape 705 has a somewhat circular forward lobe centered at 0 degrees, and is associated with a grating having a pitch of $4\lambda/8$. It should be appreciated that other beam shapes may be utilized and that in some embodiments, a pitch may be at or greater than the wavelength rather than being a partial fractional value of the wavelength. In some embodiments, by way of example and not of limitation, a configuration of grating/defined ring(s) associated with beam shapes 703, 704, and/or 705 may be employed to attenuate direct path echoes which result from a subset of the transmitted sonic signals from a first sensor, which attempt to travel across the external surface (e.g., 475, 575, 675) between a first acoustic opening port (e.g., 406, 506, 606) and a second acoustic opening port (e.g. 406B, 506B, 606B).

Cliff Detection and Depth Estimation Using Tilted Sensors

When detecting for drop-offs/cliffs from a moving device 100, latency is a concern. With a sensor 150 (or multiple sensors 150) which are pointed straight down at a surface 300, forward speed of a device 100 is limited by the latency of sending out a sonic signal, receiving corresponding returned signals, processing the signals, and then making a determination about whether a cliff exists and/or what floor type is below the device 100. For example, and with reference to FIG. 3, when a straight down (i.e., orthogonal) orientation is employed for sensor assembly 350, forward wheel 305 has to be positioned far enough behind sensor assembly 350 to account for the latency so that the wheel 305 will not go over a cliff edge before it is detected. In this manner, cliff detection latency may dictate the separation between sensor assembly 350 and wheel 305 and may also limit forward speed (i.e., in direction 301) of device 100 to a speed at which cliff detection can occur and action can be taken before wheel 305 goes over a cliff edge.

As discussed previously herein, adding a small tilt angle to sensor assembly 350 may be employed in some embodiments to allow sensor assembly to sense both downward toward floor 300 (for floor type detection) and forward in direction of travel 301 (to see cliff edges before being directly on top of them). As discussed previously, this tilt angle may be in a range of greater than 0 degrees and up to about 30 degrees to provide a combination of forward looking and downward looking. In various embodiments, the tilt angle may be utilized with or without the defined ring(s) described herein. When used with a defined ring, crosstalk in the form of a direct path echo between sensor 150 and sensor 150B is reduced (as has been described) and consequently signal-to-noise ratio is increased. Increasing the signal-to-noise ratio results in greater sensitivity to cliff detection, as it is less likely that a direct path echo will be interpreted as a cliff and less likely a direct path echo will obscure a signal from an actual cliff (which may have a small amplitude). Use of a tilt angle (and additionally, in some embodiments, use of one or more defined rings) allows for one or more of: earlier detection of cliffs due to forward looking, more reliable detection of cliffs due to improved signal-to-noise ratio, allowing for increased spacing between a sensor assembly 350 and a wheel 301 due to reduced latency of cliff detection (i.e., the time between detecting a cliff and being at/above its edge); and/or facilitating increased speed of device 100 due to reduced latency of cliff detection. By way of example, and not of limitation, in an embodiment of a device 100 using an 18 mm long acoustic interface tube 405 it has been noted that adjusting the tilt angle from zero (pointed straight down) by fifteen degrees in a forward direction of travel results in: cliff detection occurring 621 ms earlier for a device 100 traveling at a slow speed of 20 mm/second; and cliff detection occurring 124 ms earlier for a device 100 traveling at a medium speed of 100 mm/second. In an example where a device 100 is using a 50 mm long acoustic interface tube 405 with a 15 degree tilt in a forward direction of travel of device 100, cliff detection occurs 176 mm sooner (than it would for a zero tilt acoustic interface tube 405) when the device 100 is traveling at a medium speed of 100 mm/second.

Cliff detection can take one or both of two forms. First, cliff detection may involve sensing an absence of a floor 300 where one was previously present or was expected to be present. Second, cliff detection may involve sensing a drop-off or lower area in or the near vicinity of the detected floor 300 upon which a device 100 is operating. Processor 110 and/or sensor processor 130 may analyze/process corresponding returned signals received (e.g., by sensor 150B) to accomplish such cliff detections. In the second example, a depth estimation for a detected cliff may be performed.

Figure 8:
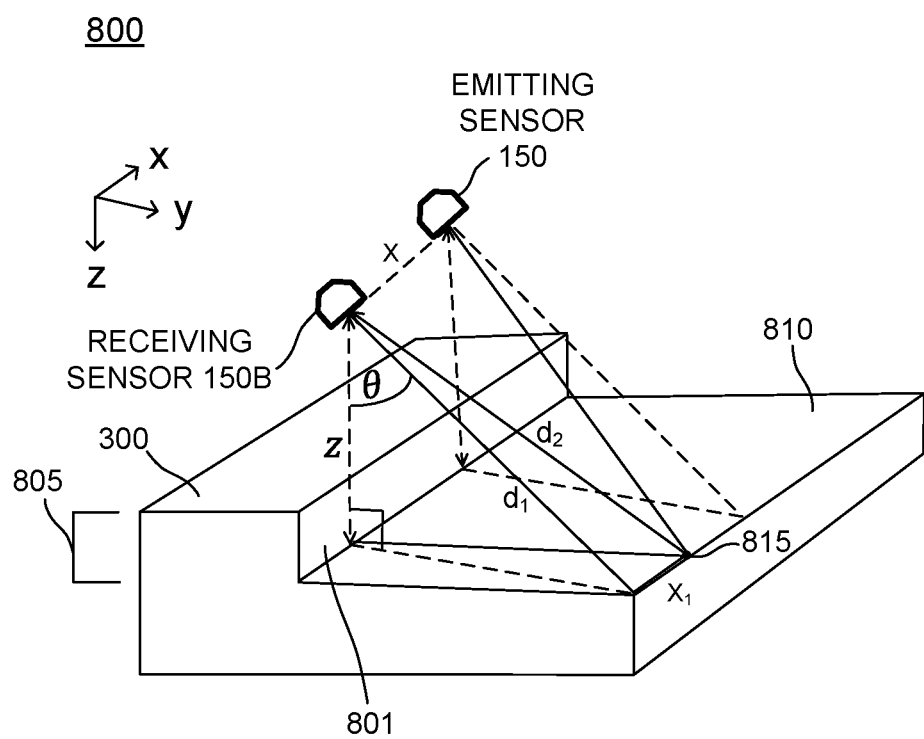
FIG. 8 shows an illustration of the ultrasonic sensors of a sensor assembly detecting a cliff and estimating its depth, in accordance with various embodiments.

FIG. 8 shows an illustration 800 of the ultrasonic sensors of a sensor assembly 450 detecting a cliff and estimating its depth, in accordance with various embodiments. For purposes of simplicity and clarity, device 100 (e.g., device 100A or 100B) is omitted and sensors 150 and 150B are shown in a tilt angle as they would be held by housing 450A of FIG. 4A (which, for purposes of clarity, is not depicted). The distance (X) between the centers of the openings of the sensors 150 and 150B is illustrated and known. In some embodiments distance X is small, such as between 1 cm and 2 cm. Sensor 150B is operating as a receiver, while sensor 150 is operating as an emitter/transmitter. The angle of tilt (e.g., tilt angle 489 in FIG. 4A) from orthogonal (theta) allows emitter 150 to project its signal forward off the edge of stair riser 801 to the tread 810 at the top of the next step downward. Similarly, the tilt angle 489 (shown as theta) of sensor 150B allows it to readily receive returned signals that reflect from point 815 on tread 810. In this manner, detection of the cliff drop-off of riser 801 occurs sooner than it would if both sensors 150 and 150B were oriented orthogonal to floor 300 (e.g., in the manner illustrated in FIG. 6A) rather than tilted from orthogonal with respect to floor 300. Via time-of-flight measurement between emission and receipt of corresponding returned signals and vial the use of routine trigonometry the distances D1, D2, and X1 can be calculated and the depth (Z) from the sensor 150B to tread 810 can be determined. With prior knowledge of approximately how high sensors 150 and 150B are mounted above floor 300 (such as within a device 100), subtraction of this known height value from height Z above the detected cliff floor (e.g., tread 810) can be used to estimate the cliff depth 805 (i.e., the depth of the drop from floor 300 to tread 810). These calculations may be performed by host processor 110 and/or sensor processor 130. If the drop-off height 805 exceeds a preestablished threshold associated with a device 100, a host processor 110 of device 100 may direct certain actions such as reversing direction, slowing forward travel toward the edge of the cliff/drop-off, and/or initiating a turn to avoid device 100 traveling over the cliff and dropping.

In some embodiments, it may only be desired to know a rough estimate of cliff height 805, to see if it exceeds a threshold which a device 100 can handle safely. In one such embodiment, the distance between sensors 150 and 150B is small and other distances are typically not very large (e.g., less 50 cm and sometimes less than 25 cm when dealing with stairs). Accordingly, for a rough estimate, time-of-flight may be used to calculate distance d2 and it may be presumed (for rough estimate purposes) to be equal to distance d1. Then, solving for a right triangle with a height of Z and an angle of theta between sides Z and d2, a rough estimate of distance Z is easily calculated with basic trigonometry. The known height of sensor 150B above floor 300 may be subtracted from distance Z to achieve a rough estimate of height 805 (i.e., the drop-off depth). These calculations may be performed by host processor 110 and/or sensor processor 130. If the drop-off height 805 exceeds a preestablished threshold associated with a device 100, a host processor 110 of device 100 may direct certain actions such as reversing direction, slowing forward travel toward the edge of the cliff/drop-off, and/or initiating a turn to avoid device 100 traveling over the cliff and dropping.

In yet other embodiments, the relationship between distance d1, distance Z, and drop-off height 805 may be predetermined when the tilt angle theta is fixed. Accordingly, when a distance d2 is measured by time-of-flight of sonic signals the distance d2 can be compared by processor 110 to a preestablished threshold value of distance d2 that is correlates with a drop-off 805 which is expected to be harmful to the operation of device 100. In some embodiments, a lookup table may additionally or alternatively be used to correlate a measured distance d2 with a drop-off height 805. When distance d2 or the correlated drop-off height 805 exceeds such a preestablished threshold, host processor 110 of device 100 may direct certain actions such as reversing direction, slowing forward travel toward the edge of the cliff/drop-off, and/or initiating a turn to avoid device 100 traveling over the cliff and dropping.

Figure 9A:
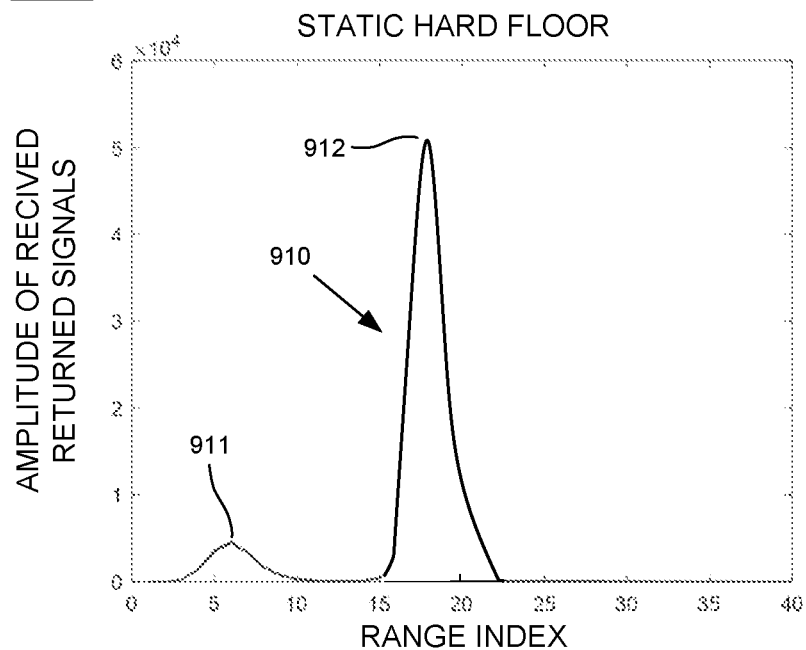
FIGS. 9A and 9B show graphs of the amplitude of received corresponding returned signals versus distance for sensor assembly tilted at 15 degrees from orthogonal and employing no defined rings around acoustic opening ports, in accordance with an embodiment.
Figure 9B:
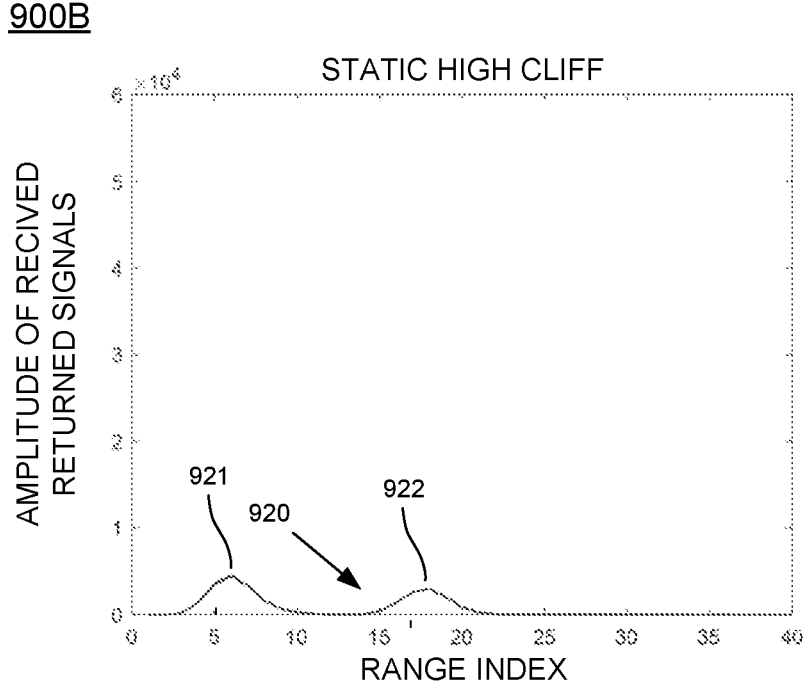

FIG. 9A and 9B show graphs 900A and 900B of the amplitude of received corresponding returned signals versus distance for sensor assembly 350 tilted at 15 degrees from orthogonal and employing no defined rings around acoustic opening ports of the sensors 150 and 150B, in accordance with an embodiment.

In FIGS. 9A and 9B the x-axis is in units of a range index which may be converted to distance away from the sensors, while the y-axis is in units of amplitude of the corresponding returned signals received by a receiving sensor.

With reference to FIG. 9A, the diagramed signal 910 shows a peak 911 at range index 6 which is related to a startup/ringdown signal of the receiving sensor (e.g., sensor 150B) and a peak 912 at range index 19 related to the detection of a static (non-moving) hard floor (e.g., tile or wood).

With reference to FIG. 9B the hard floor has been removed and replaced with a static (non-moving) large cliff from which no corresponding returned signals are received by the receiving sensor (e.g., sensor 150B), the diagramed signal 920 shows a peak 921 at range index 6 which is related to a startup/ringdown signal of the receiving sensor (e.g., sensor 150B) and a small peak 922 at range index 19 related cross-talk on the direct echo path between the emitting sensor 150 and the receiving sensor 150B. It should be noted that this peak 921 would exist as a noise component of peak 912.

Figure 10A:
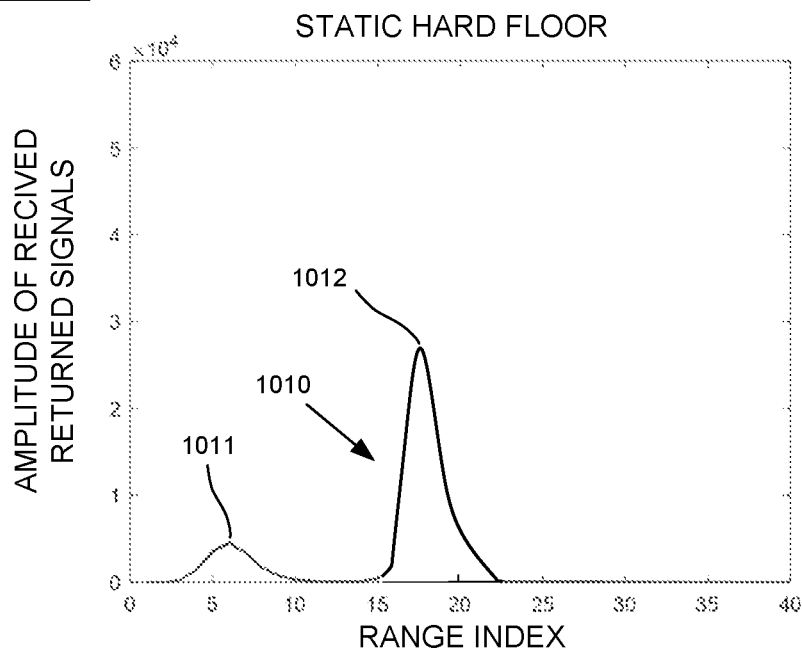
FIGS. 10A and 10B show graphs of the amplitude of received corresponding returned signals versus distance for sensor assembly tilted at 15 degrees from orthogonal and employing a single defined ring around each of the emitting sensor's acoustic opening port and the receiving sensor's acoustic opening port, in accordance with an embodiment.
Figure 10B:
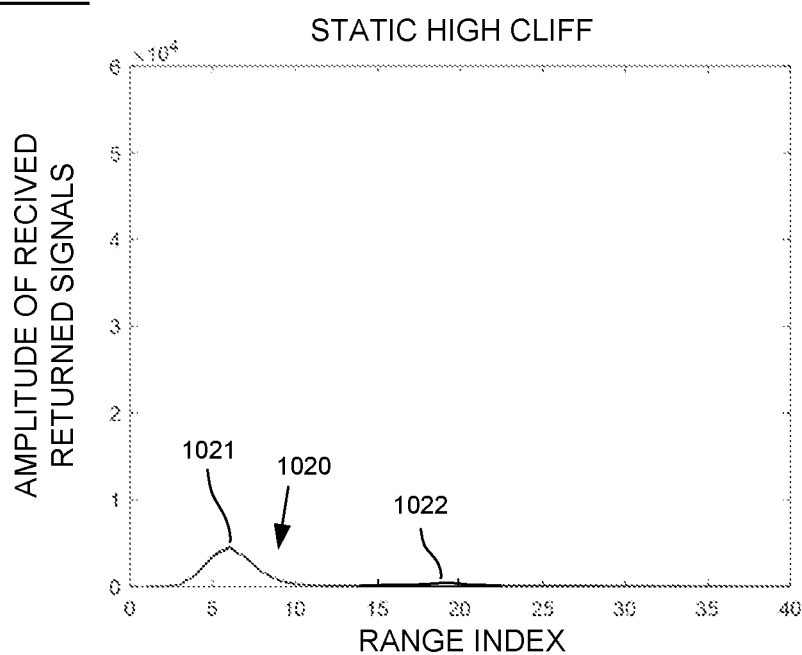

FIG. 10A and 10B show graphs 1000A and 1000B of the amplitude of received corresponding returned signals versus distance for sensor assembly 350 tilted at 15 degrees from orthogonal and employing a single defined ring around each of the emitting sensor's 150 acoustic opening port and the receiving sensor's 150B acoustic opening port, in accordance with an embodiment.

With reference to FIG. 10A, the diagramed signal 1010 shows a peak 1011 at range index 6 which is related to a startup/ringdown signal of the receiving sensor (e.g., sensor 150B) and a peak 1012 at range index 19 related to the detection of a static (non-moving) hard floor (e.g., tile or wood). Although the static hard floor is the same as the one sensed in FIG. 9A, the sensed amplitude is less (at around 60%), which is still sufficiently high to detect the hard floor and/or differentiate between different floor types (hard/soft, wet/dry, etc.)

With reference to FIG. 10B the static hard floor has been removed and replaced with a static (non-moving) large cliff from which no corresponding returned signals are received by the receiving sensor (e.g., sensor 150B), the diagramed signal 1020 shows a peak 1021 at range index 6 which is related to a startup/ringdown signal of the receiving sensor (e.g., sensor 150B) and is substantially the same amplitude as peak 911, 921, and 1011. A second small peak 1022 is at range index 19 and is related crosstalk in the form of direct path echo between the emitting sensor 150 and the receiving sensor 150B. It should be noted that this peak 1021 is substantially diminished such that it is less than half the amplitude of peak 921 (approximately 40%). Accordingly, the use of the defined rings has reduced this direct echo path noise by nearly 60%. Thus, even though the amplitude of the hard floor is lower in FIG. 10, the noise component of the direct path echo is also much lower, meaning that the signal to noise ratio is improved by use of the defined rings. In various experiments under a variety of conditions, the use of a single defined ring around each acoustic opening port of a transmitting sensor and a receiving sensor has been found to reduce direct path echo between sensors by between 9% and 59%, with an average reduction of 29%. Accordingly, utilizing a plurality of rings around each acoustic opening port to shape the emitted and received beams of ultrasonic signals can reduce the direct echo path by at least this much and more.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A robotic cleaning appliance comprising:
   a housing to which is coupled a surface treatment item;
   a sensor assembly coupled with the housing, the sensor assembly comprising:
      a first sonic transducer configured to transmit sonic signals toward a surface beneath the robotic cleaning appliance wherein the sonic signals reflect from the surface as corresponding returned signals;
      a second sonic transducer configured to receive the corresponding returned signals reflected from the surface; and
      an acoustic interface coupled with the first sonic transducer and the second sonic transducer and having an external surface, the acoustic interface comprising:
         a first acoustic opening port defined in the external surface, coupled with the first sonic transducer, and configured to emit the sonic signals directed from the first sonic transducer toward the surface;
         a first plurality of annular rings defined in the external surface, at a different height than the external surface, around the first acoustic opening port;
         a second acoustic opening port defined in the external surface, coupled with the second sonic transducer, and configured to direct the corresponding returned signals to the second sonic transducer; and
         a second plurality of annular rings defined in the external surface, at a different height than the external surface, around the second acoustic opening port;
      wherein the first plurality of annular rings and the second plurality of annular rings operate to attenuate direct path echoes which result from a subset of the transmitted sonic signals which attempt to travel across the external surface between the first acoustic opening port and the second acoustic opening port.

2. The robotic cleaning appliance of claim 1, further comprising:
   a processor coupled with the housing and configured to process the corresponding returned signals received by the second sonic transducer to determine information about the surface beneath the robotic cleaning appliance.

3. The robotic cleaning appliance of claim 1, wherein valleys and ridges of annular rings of the first plurality of annular rings are of equal width.

4. The robotic cleaning appliance of claim 1, wherein valleys between annular rings of the first plurality of annular rings are of a first width and ridges of the annular rings of the first plurality of annular rings are of a second width, and wherein the first width and second width are different.

5. The robotic cleaning appliance of claim 1, wherein annular rings of the first plurality of annular rings are concentric.

6. The robotic cleaning appliance of claim 1, wherein the first plurality of annular rings and the second plurality of annular rings are equal in number.

7. The robotic cleaning appliance of claim 1, wherein the first plurality of annular rings are embossed with respect to the external surface.

8. The robotic cleaning appliance of claim 1, wherein the first plurality of annular rings are debossed with respect to the external surface.

9. The robotic cleaning appliance of claim 1, wherein a pitch of a distance separating ridges of annular rings of the first plurality of annular rings is selected to tune a beam pattern of the first sonic transducer, wherein the first sonic transducer is a transmitting transducer.

10. The robotic cleaning appliance of claim 9, wherein a pitch of a distance separating ridges of annular rings of the second plurality of annular rings is selected to tune a beam pattern of the second sonic transducer, wherein the second sonic transducer is a receiving transducer.

11. A sensor assembly comprising:
   a first sonic transducer configured to transmit sonic signals toward a surface, wherein the sonic signals reflect from the surface as corresponding returned signals;
   a second sonic transducer configured to receive the corresponding returned signals reflected from the surface; and
   an acoustic interface coupled with the first sonic transducer and the second sonic transducer and having an external surface, the acoustic interface comprising:
      a first acoustic opening port defined in the external surface, coupled with the first sonic transducer, configured to emit the sonic signals directed from the first sonic transducer toward the surface;
      a first plurality of annular rings defined in the external surface, at a different height than the external surface, around the first acoustic opening port;
      a second acoustic opening port defined in the external surface, coupled with the second sonic transducer, and configured to direct the corresponding returned signals to the second sonic transducer; and
      a second plurality of annular rings defined in the external surface, at a different height than the external surface, around the second acoustic opening port;
      wherein the first plurality of annular rings and the second plurality of annular rings operate to attenuate direct path echoes which result from a subset of the transmitted sonic signals which attempt to travel across the external surface between the first acoustic opening port and the second acoustic opening port.

12. The sensor assembly of claim 11, wherein valleys and ridges of annular rings of the first plurality of annular rings are of equal width.

13. The sensor assembly of claim 11, wherein valleys between annular rings of the first plurality of annular rings are of a first width and ridges of the annular rings of the first plurality of annular rings are of a second width, and wherein the first width and second width are different.

14. The sensor assembly of claim 11, wherein the first plurality of annular rings and the second plurality of annular rings are equal in number.

15. The sensor assembly of claim 11, wherein the first plurality of annular rings are embossed with respect to the external surface.

16. The sensor assembly of claim 11, wherein the first plurality of annular rings are debossed with respect to the external surface.

17. The sensor assembly of claim 11, wherein a pitch of a distance separating ridges of annular rings of the first plurality of annular rings is selected to tune a beam pattern of the first sonic transducer, wherein the first sonic transducer is a transmitting transducer.

18. The sensor assembly of claim 17, wherein a pitch of a distance separating ridges of annular rings of the second plurality of annular rings is selected to tune a beam pattern of the second sonic transducer, wherein the second sonic transducer is a receiving transducer.

19. The sensor assembly of claim 12, wherein annular rings of the first plurality of annular rings are concentric.

20. The sensor assembly of claim 12, wherein an outer annular ring of the first plurality of annular rings is tangent to an outer annular ring of the second plurality of annular rings.

\* \* \* \* \*